(12) United States Patent
Fujii et al.

(10) Patent No.: US 10,678,038 B2
(45) Date of Patent: Jun. 9, 2020

(54) SCANNING CONFOCAL MICROSCOPE APPARATUS, SCANNING CONTROL METHOD, AND RECORDING MEDIUM

(71) Applicant: OLYMPUS CORPORATION, Hachioji-shi, Tokyo (JP)

(72) Inventors: Akihiro Fujii, Tokyo (JP); Yosuke Tani, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 154 days.

(21) Appl. No.: 15/819,358

(22) Filed: Nov. 21, 2017

(65) Prior Publication Data

US 2018/0164563 A1 Jun. 14, 2018

(30) Foreign Application Priority Data

Dec. 9, 2016 (JP) .................................. 2016-239798

(51) Int. Cl.
| | | |
|---|---|---|
| *G02B 21/00* | (2006.01) | |
| *G06T 7/50* | (2017.01) | |
| *G06T 5/50* | (2006.01) | |
| *G01B 11/24* | (2006.01) | |
| *G01B 9/04* | (2006.01) | |

(52) U.S. Cl.
CPC ............. *G02B 21/008* (2013.01); *G01B 9/04* (2013.01); *G01B 11/24* (2013.01); *G02B 21/00* (2013.01); *G02B 21/0024* (2013.01); *G02B 21/0036* (2013.01); *G02B 21/0072* (2013.01); *G06T 5/50* (2013.01); *G06T 7/50* (2017.01); *G06T 2207/10056* (2013.01); *G06T 2207/20021* (2013.01)

(58) Field of Classification Search
CPC .................... G02B 21/0024; G02B 21/0036
See application file for complete search history.

(56) References Cited

U.S. PATENT DOCUMENTS 5,672,861 A * 9/1997 Fairley ................. G02B 21/006
250/201.3
5,991,040 A * 11/1999 Doemens ............... G01B 11/24
356/614

(Continued)

FOREIGN PATENT DOCUMENTS

| JP | 2003042720 A * | 2/2003 |
|---|---|---|
| JP | 2004138761 A | 5/2004 |

(Continued)

*Primary Examiner* — Brian T Pendleton
*Assistant Examiner* — Kyle M Lotfi
(74) *Attorney, Agent, or Firm* — Holtz, Holtz & Volek PC

(57) ABSTRACT

A scanning confocal microscope apparatus includes: a scanning confocal microscope that includes an objective lens; a computing device that divides a range in a direction of an optical axis of the objective lens of a preliminary scanning area on which preliminary scanning has been performed into a plurality of groups, in accordance with data obtained by performing the preliminary scanning using the scanning confocal microscope; and a controller that controls the scanning confocal microscope so as to perform principal scanning in which at least a portion of the preliminary scanning area is scanned under a measurement condition determined for each of the plurality of groups.

17 Claims, 27 Drawing Sheets

(56) References Cited

U.S. PATENT DOCUMENTS

| | | | | |
|---|---|---|---|---|
| 6,580,518 B2 * | 6/2003 | Eda | ............... | G02B 21/0024 356/609 |
| 6,674,572 B1 * | 1/2004 | Scheruebl | ......... | G02B 21/0024 356/237.5 |
| 2016/0047645 A1 * | 2/2016 | de Groot | ............. | G01B 9/0209 356/511 |

FOREIGN PATENT DOCUMENTS

| | | |
|---|---|---|
| JP | 3847422 B2 | 11/2006 |
| JP | 2012022135 A | 2/2012 |

* cited by examiner

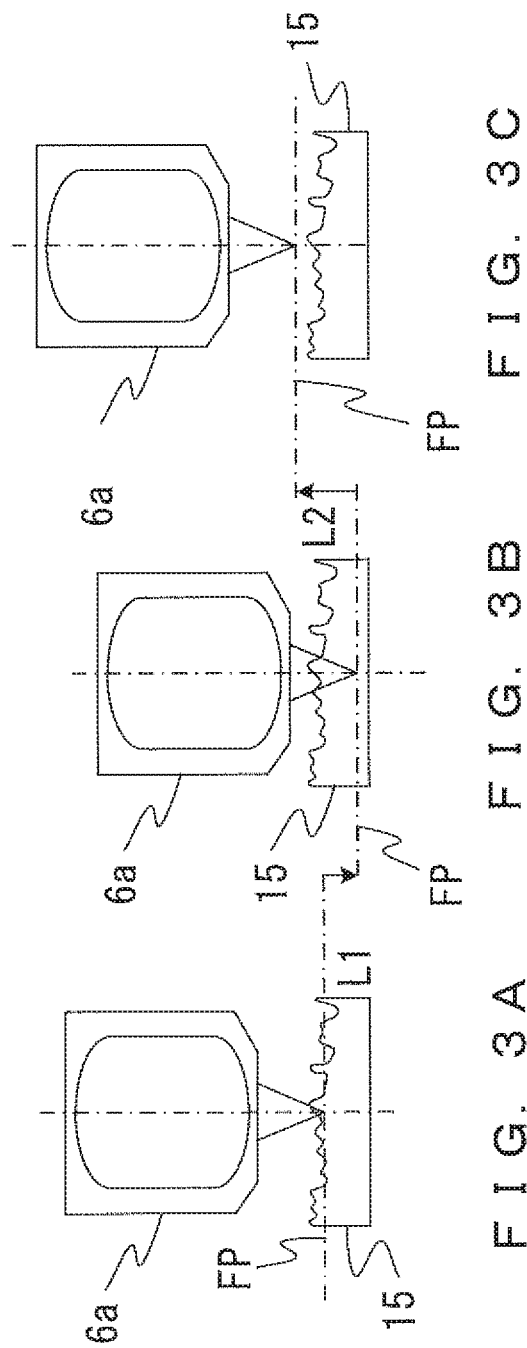

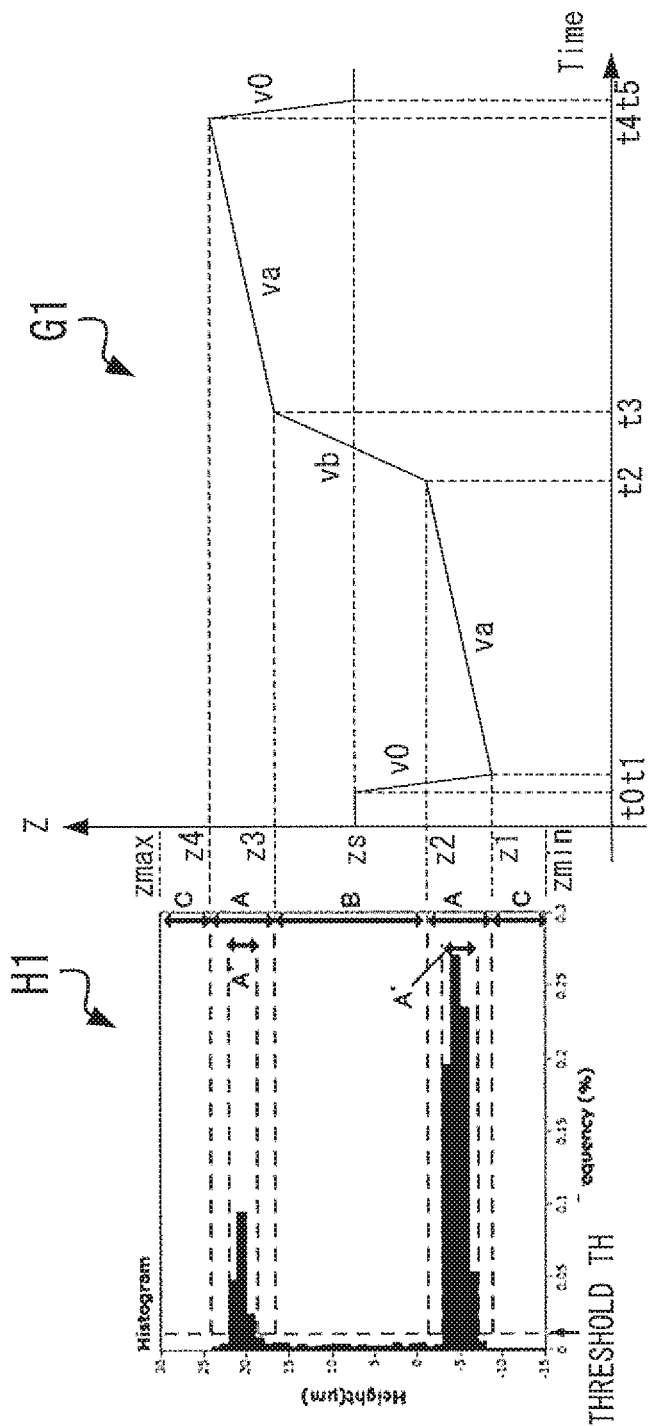
F I G. 11

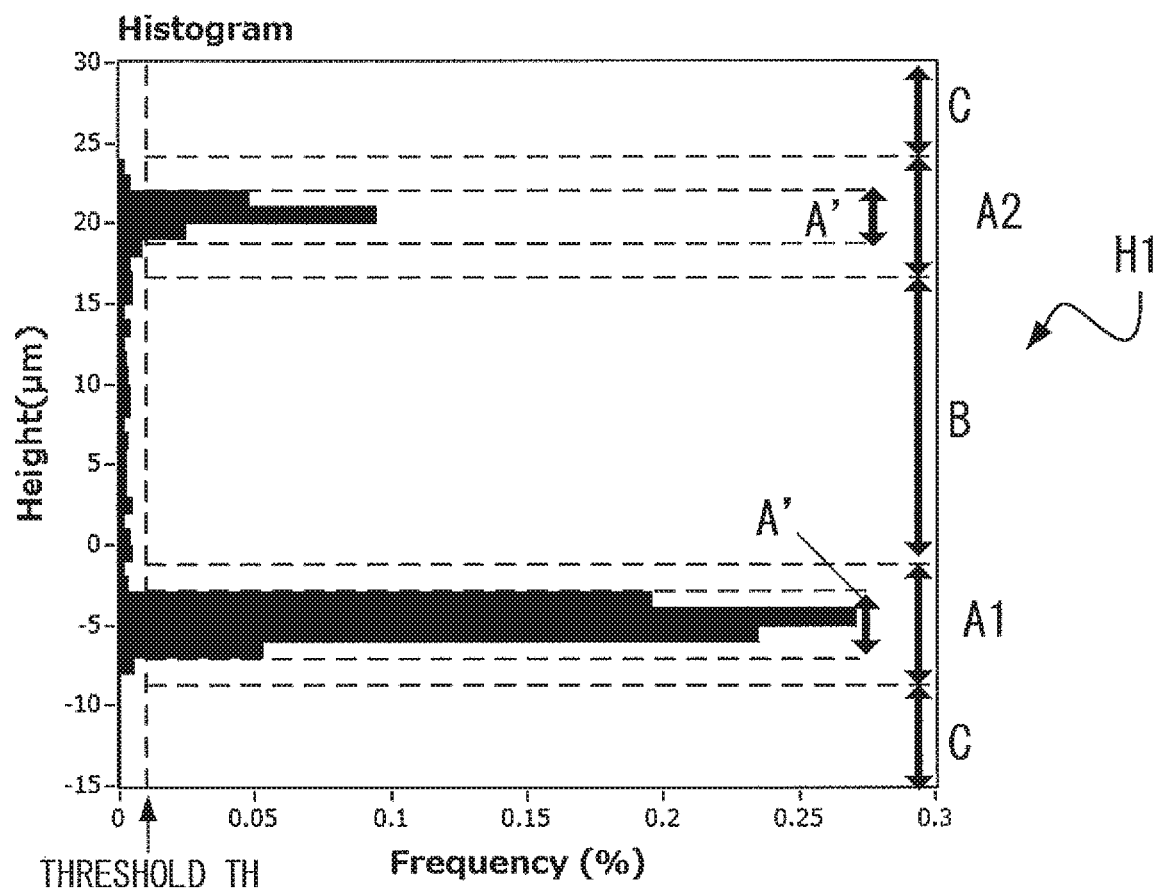
F I G. 17

| Frame No. n | Z-POSITION (μm) | RATIO OF PIXEL FOR WHICH LUMINANCE EXCEEDS THRESHOLD (%) | A' DETERMINATION | SECTION DETERMINATION |
|---|---|---|---|---|
| 45 | 22 | 0.0001 | | C |
| 44 | 21.5 | 0.0001 | | |
| 43 | 21 | 0.002 | | A |
| 42 | 20.5 | 0.008 | | |
| 41 | 20 | 0.05 | A' | |
| 40 | 19.5 | 0.02 | A' | |
| 39 | 19 | 0.01 | A' | |
| 38 | 18.5 | 0.003 | | |
| 37 | 18 | 0.0002 | | |
| 36 | 17.5 | 0.001 | | B |
| 35 | 17 | 0.001 | | |
| 34 | 16.5 | 0 | | |
| 33 | 16 | 0.001 | | |
| 32 | 15.5 | 0.001 | | |
| 31 | 15 | 0.001 | | |
| 30 | 14.5 | 0.001 | | |
| 29 | 14 | 0.001 | | |
| 28 | 13.5 | 0.001 | | |
| 27 | 13 | 0.001 | | |
| 26 | 12.5 | 0.0001 | | |
| 25 | 12 | 0.0007 | | A |
| 24 | 11.5 | 0.003 | | |
| 23 | 11 | 0.08 | A' | |
| 22 | 10.5 | 0.15 | A' | |
| 21 | 10 | 0.32 | A' | |
| 20 | 9.5 | 0.2 | A' | |
| 19 | 9 | 0.012 | A' | |
| 18 | 8.5 | 0.004 | | |
| 17 | 8 | 0.0002 | | |
| 16 | 7.5 | 0.001 | | B |
| 15 | 7 | 0.001 | | |
| 14 | 6.5 | 0 | | |
| 13 | 6 | 0.0005 | | |
| 12 | 5.5 | 0.001 | | |
| 11 | 5 | 0.0008 | | A |
| 10 | 4.5 | 0.0012 | | |
| 9 | 4 | 0.05 | A' | |
| 8 | 3.5 | 0.11 | A' | |
| 7 | 3 | 0.02 | A' | |
| 6 | 2.5 | 0.018 | A' | |
| 5 | 2 | 0.008 | | |
| 4 | 1.5 | 0.002 | | |
| 3 | 1 | 0.001 | | C |
| 2 | 0.5 | 0.001 | | |
| 1 | 0 | 0.0001 | | |
F I G. 2 0

| Frame No. n | Z-POSITION (μm) | RATIO OF PIXEL FOR WHICH LUMINANCE EXCEEDS THRESHOLD (%) | B DETERMINATION | SECTION DETERMINATION |
|---|---|---|---|---|
| 45 | 22 | 0.0001 | B | |
| 44 | 21.5 | 0.0001 | B | B |
| 43 | 21 | 0.002 | B | |
| 42 | 20.5 | 0.008 | B | |
| 41 | 20 | 0.05 | | |
| 40 | 19.5 | 0.02 | | A |
| 39 | 19 | 0.01 | | |
| 38 | 18.5 | 0.003 | B | |
| 37 | 18 | 0.0002 | B | |
| 36 | 17.5 | 0.001 | B | |
| 35 | 17 | 0.001 | B | |
| 34 | 16.5 | 0 | B | |
| 33 | 16 | 0.001 | B | |
| 32 | 15.5 | 0.001 | B | |
| 31 | 15 | 0.001 | B | B |
| 30 | 14.5 | 0.001 | B | |
| 29 | 14 | 0.001 | B | |
| 28 | 13.5 | 0.001 | B | |
| 27 | 13 | 0.001 | B | |
| 26 | 12.5 | 0.0001 | B | |
| 25 | 12 | 0.0007 | B | |
| 24 | 11.5 | 0.003 | B | |
| 23 | 11 | 0.08 | | |
| 22 | 10.5 | 0.15 | | |
| 21 | 10 | 0.32 | | A |
| 20 | 9.5 | 0.2 | | |
| 19 | 9 | 0.012 | | |
| 18 | 8.5 | 0.004 | B | |
| 17 | 8 | 0.0002 | B | |
| 16 | 7.5 | 0.001 | B | |
| 15 | 7 | 0.001 | B | |
| 14 | 6.5 | 0 | B | B |
| 13 | 6 | 0.0005 | B | |
| 12 | 5.5 | 0.001 | B | |
| 11 | 5 | 0.0008 | B | |
| 10 | 4.5 | 0.0012 | B | |
| 9 | 4 | 0.05 | | |
| 8 | 3.5 | 0.11 | | A |
| 7 | 3 | 0.02 | | |
| 6 | 2.5 | 0.018 | | |
| 5 | 2 | 0.008 | B | |
| 4 | 1.5 | 0.002 | B | |
| 3 | 1 | 0.001 | B | B |
| 2 | 0.5 | 0.001 | B | |
| 1 | 0 | 0.0001 | B | |

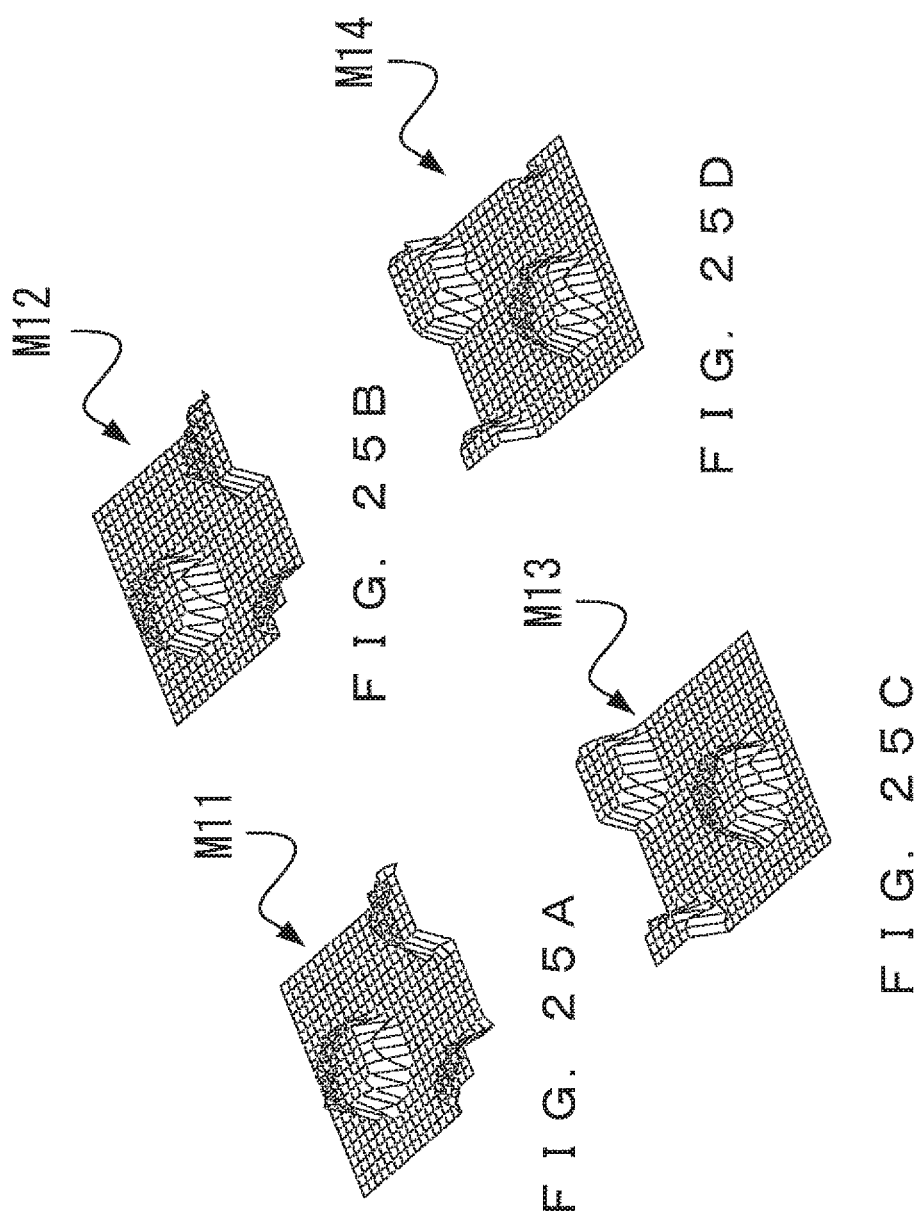

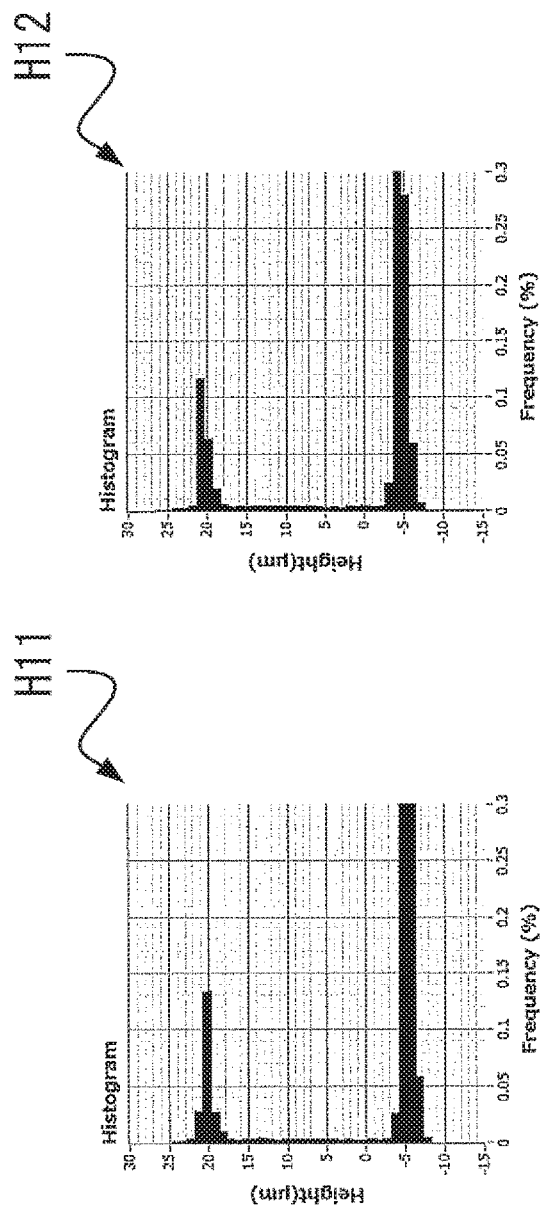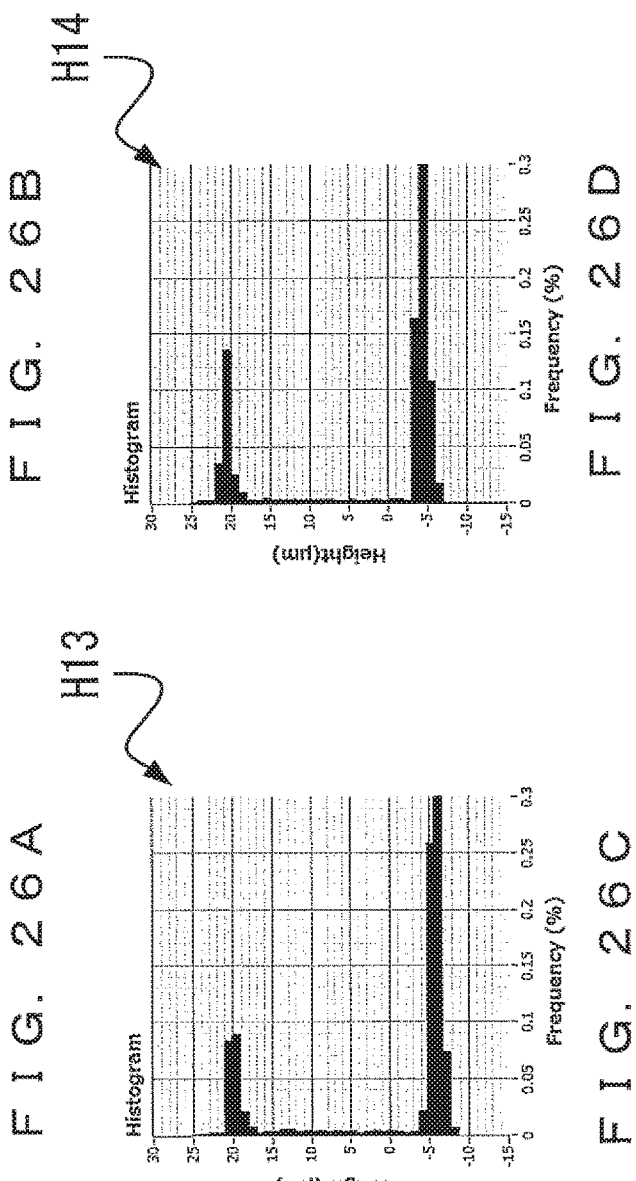
FIG. 26A  FIG. 26B  FIG. 26C  FIG. 26D

SCANNING CONFOCAL MICROSCOPE APPARATUS, SCANNING CONTROL METHOD, AND RECORDING MEDIUM

CROSS REFERENCE TO RELATED APPLICATIONS

This application is based upon and claims the benefit of priority from the prior Japanese Patent Application No. 2016-239798, filed on Dec. 9, 2016, the entire contents of which are incorporated herein by this reference.

BACKGROUND OF THE INVENTION

Field of the Invention

The present invention relates to a scanning confocal microscope apparatus, a scanning control method, and a recording medium.

Description of the Related Art

As an apparatus that measures a three-dimensional shape of an object in a non-contact manner, confocal microscope apparatuses are conventionally known. Among the confocal microscope apparatuses, a laser scanning confocal microscope apparatus using a laser as a light source, as described in Japanese Patent No. 3847422, for example, is now widely used in the industrial world.

The laser scanning confocal microscope apparatus irradiates a specimen with a laser beam collected in a spot shape by an objective lens, and scans the specimen in a two-dimensional direction (the XY-plane direction). Light reflected by the specimen is received by a detector via a confocal diaphragm. An aperture of the confocal diaphragm is formed in a position that is optically conjugate to a focal position of the objective lens, and therefore only reflected light from an in-focus portion passes through the confocal diaphragm, and is received by the detector. Therefore, the laser scanning confocal microscope apparatus has a shallower depth of focus than that of a normal optical microscope, and can obtain a luminance image in which only the in-focus portion has been imaged. In general, this image is referred to as a confocal image.

When a surface shape of a specimen is measured by using the laser scanning confocal microscope apparatus, the shallow depth of focus described above is used. Specifically, a plurality of confocal images with a shallow depth of focus are obtained while changing a relative length in an optical-axis direction (a z-direction) between an objective lens and the specimen. The surface shape of the entire surface of the specimen is measured by obtaining a Z-position (namely, a focusing position) that gives the maximum luminance in each pixel position from the plurality of confocal images.

SUMMARY OF THE INVENTION

A scanning confocal microscope apparatus in one aspect of the present invention includes: a scanning confocal microscope that includes an objective lens, and that scans a sample; a computing device that divides a range in a direction of an optical axis of the objective lens, of a preliminary scanning area on which preliminary scanning has been performed into a plurality of groups, in accordance with data obtained by performing the preliminary scanning using the scanning confocal microscope; and a controller that controls the scanning confocal microscope so as to perform principal scanning in which at least a portion of the preliminary scanning area is scanned under a measurement condition determined for each of the plurality of groups.

A scanning control method in one aspect of the present invention includes: dividing a range in a direction of an optical axis of an objective lens, of a preliminary scanning area on which preliminary scanning has been performed into a plurality of groups, in accordance with data obtained by performing the preliminary scanning using a scanning confocal microscope including the objective lens; and controlling the scanning confocal microscope so as to perform principal scanning in which at least a portion of the preliminary scanning area is scanned under a measurement condition determined for each of the plurality of groups.

A recording medium in one aspect of the present invention is a non-transitory recording medium having stored therein a program for causing a computer to execute a process including: dividing a range in a direction of an optical axis of an objective lens, of a preliminary scanning area on which preliminary scanning has been performed into a plurality of groups, in accordance with data obtained by performing the preliminary scanning using a scanning confocal microscope including the objective lens; and causing a controller to control the scanning confocal microscope so as to perform principal scanning in which at least a portion of the preliminary scanning area is scanned under a measurement condition determined for each of the plurality of groups.

BRIEF DESCRIPTION OF THE DRAWINGS

The present invention will be more apparent from the following detailed description when the accompanying drawings are referenced.

FIG. 3A to FIG. 3C are diagrams explaining the operation of an objective lens 6a during preliminary scanning.

FIG. 11 illustrates a relationship between a group and a scanning speed in an optical-axis direction in principal scanning.

FIG. 17 illustrates an example in which a plurality of sections included in the same group are distinguished from each other.

FIG. 20 illustrates an example of a table generated in order to divide a height range into groups.

FIG. 23 illustrates another example of a table generated in order to divide a height range into groups.

FIG. 25A to FIG. 25D illustrate an example of an image in which height information calculated according to data obtained in preliminary scanning is divided and displayed for each visual field area.

FIG. 26A to FIG. 26D illustrate a histogram indicating height information that is generated for each visual field area in order to divide a height range into groups.

DESCRIPTION OF THE EMBODIMENTS

In order to measure the surface shape of the entire surface of a specimen, it is preferable that a range in an optical-axis direction of a scanning area (hereinafter referred to as a Z-scanning range) be set in advance in such a way that all of the portions on an uneven surface are put into focus during scanning. In addition, in a case in which stitching measurement is performed, it is preferable that the Z-scanning range be set for each of a plurality of measurement areas.

In a conventional laser scanning confocal microscope apparatus, when the Z-scanning range is set to be excessively wide, it takes too much time to obtain data for measurement. When the Z-scanning range is set to be excessively narrow, the entire surface of a specimen is not included within a scanning area, and it is difficult to accurately measure a surface shape.

Accordingly, it is expected that an appropriate Z-scanning range that is not excessively wide be set such that the entire surface of the specimen is included within the scanning range. However, it is not always easy to set the appropriate Z-scanning range, and it is a difficult and complicated task, in particular, for beginners who do not understand a measurement principle.

First Embodiment

Figure 1:
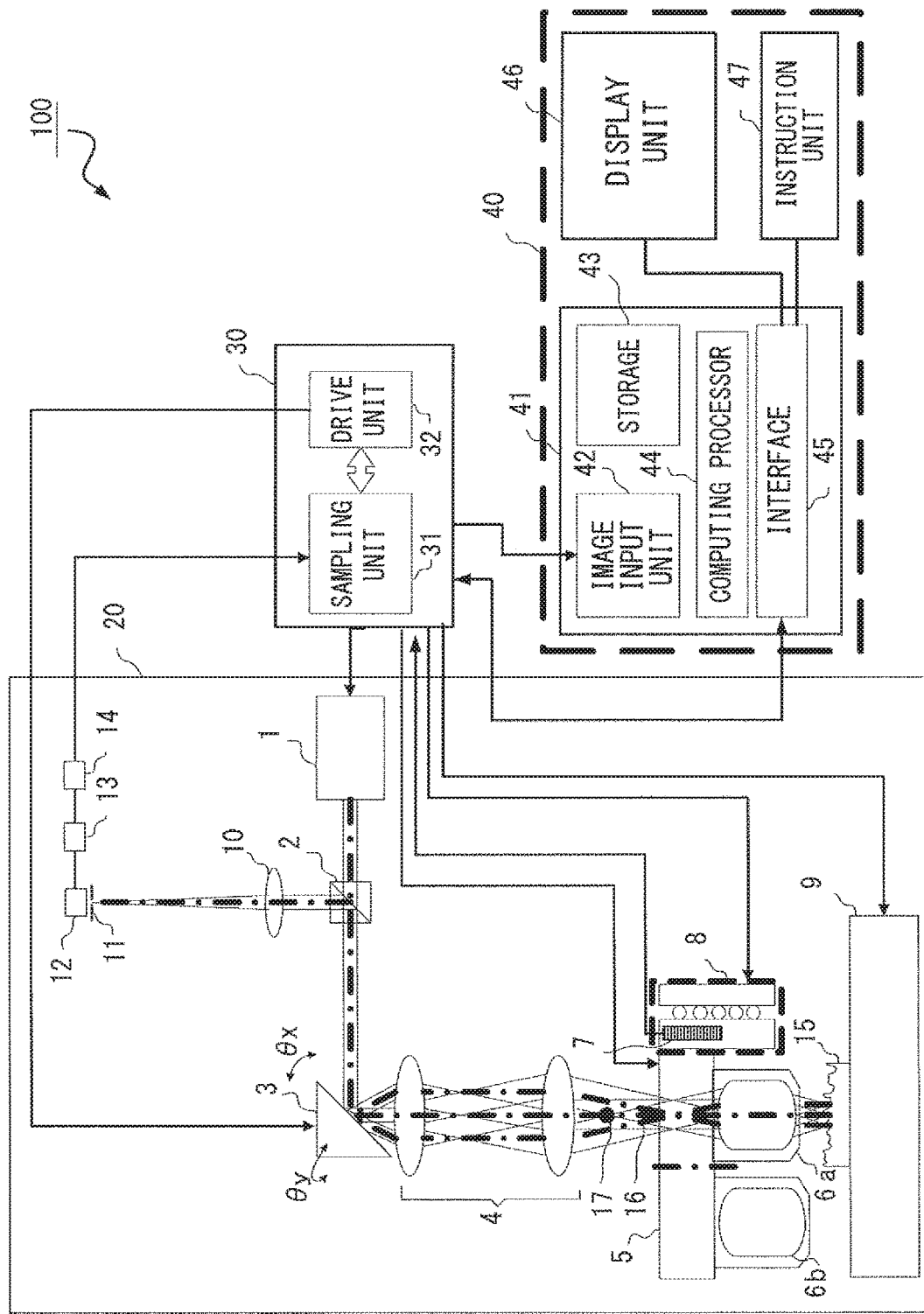
FIG. 1 illustrates the configuration of a confocal microscope apparatus 100 according to a first embodiment.

FIG. 1 illustrates the configuration of a confocal microscope apparatus 100 according to this embodiment. The confocal microscope apparatus 100 is an apparatus that measures a three-dimensional shape of a specimen 15, which is a sample, in a non-contact manner. By using an image stitching technology, the height of the specimen 15 can be measured within a range that is wider than a field of view. The specimen 15 is, for example, a semiconductor substrate. First, the configuration of the confocal microscope apparatus 100 is described with reference to FIG. 1.

The confocal microscope apparatus 100 is a laser scanning confocal microscope apparatus including a laser 1. As illustrated in FIG. 1, the confocal microscope apparatus 100 includes a confocal microscope body 20, a controller 30 that controls the confocal microscope body 20, and a computer 40 that is connected to the controller 30.

The confocal microscope body 20 is a scanning confocal microscope that scans a sample with a laser beam. The confocal microscope body 20 includes a beam splitter 2, a two-dimensional deflector 3, a projection lens 4, and an objective lens 6a on an illumination light path through which a laser beam emitted from the laser 1 reaches the specimen 15.

The laser 1 is a light source that emits a laser beam as parallel light. An amount of the laser beam emitted from the laser 1 is controlled according to an input from the controller 30. Specifically, an amount of light emitted from the laser 1 is changed, for example, by changing a driving current of the laser 1 by using the controller 30.

The beam splitter 2 is, for example, a polarization beam splitter, a half mirror, or the like. When the specimen 15 is a biological sample or the like, the beam splitter 2 may be a dichroic mirror. The beam splitter 2 transmits the laser beam from the laser 1, and reflects reflected light from the specimen 15.

The two-dimensional deflector 3 is a device that deflects the laser beam from the laser 1 in a desired direction. The two-dimensional deflector 3 is a scanner that scans the specimen 15 with the laser beam in a two-dimensional direction (an XY-direction) that is orthogonal to an optical axis 16 of the objective lens 6a. The two-dimensional deflector 3 is a scanner that is arranged in or near a position that is optically conjugate to the pupil of the objective lens 6a, and the two-dimensional deflector 3 is, for example, a galvanometer mirror, a resonant scanner, an acousto-optic element, or the like. The two-dimensional deflector 3 is configured to independently deflect the laser beam in an X-direction and a Y-direction. The two-dimensional deflector 3 changes a deflection angle $\theta_x$ for the X-direction and a deflection angle $\theta_y$ for the Y-direction of the laser beam in accordance with an instruction of a deflection timing from a drive unit 32 within the controller 30. FIG. 1 illustrates a plurality of light fluxes having different deflection angles $\theta_x$.

The projection lens 4 is a lens that projects the pupil of the objective lens 6a onto or near the two-dimensional deflector 3. The projection lens 4 is arranged in such a way that a focal position on an object side of the projection lens 4 is located near a rear-side focal position 17 of the objective lens 6a. The projection lens 4 enlarges the diameter of the laser beam as parallel light that has been emitted from the laser 1, and the projection lens 4 makes the laser beam incident on the objective lens 6a.

The objective lens 6a is attached to a revolver 5. A plurality of objective lenses of different magnifications or different types are attached to the revolver 5. In the example illustrated in FIG. 1, in addition to the objective lens 6a, an objective lens 6b having a magnification higher than that of the objective lens 6a is attached to the revolver 5. The revolver 5 rotates or slides according to an instruction from the drive unit 32 of the controller 30 so as to switch an objective lens to be arranged on the illumination light path.

The revolver 5 with the plurality of objective lenses attached is fixed to a Z-scanning stage 8. The Z-scanning stage 8 is a device that changes a relative length between the objective lens 6a and an XY-scanning stage 9. The Z-scanning stage 8 is a scanner that scans the specimen 15 in a direction along the optical axis 16 (hereinafter referred to as an optical-axis direction or a Z-direction) of the objective lens 6a. The Z-scanning stage 8 is configured to move in the Z-direction in accordance with an instruction from the drive unit 32. The objective lens 6a moves in the Z-direction by the Z-scanning stage 8 moving in the Z-direction.

A displacement gauge 7 that measures a displacement amount generated due to the movement of the Z-scanning stage 8 in the Z-direction, namely, a change amount of the relative length between the objective lens 6a and the XY-scanning stage 9, is provided in the Z-scanning stage 8. The displacement gauge 7 is, for example, an optical linear encoder. The displacement gauge 7 may be an electrostatic-capacitance-type displacement gauge or another displacement gauge. The displacement gauge 7 measures a displacement amount in synchronization with an image acquisition timing. The displacement amount measured by the displacement gauge 7 is output to the controller 30.

The specimen 15 is arranged near a front-side focal position of the objective lens 6a on the XY-scanning stage 9. The XY-scanning stage 9 is a movable stage that moves in the X-direction and the Y-direction that are orthogonal to the optical axis 16 of the objective lens 6a. The XY-scanning stage 9 may be an electric stage that operates according to an instruction from the drive unit 32, or may be a manual stage.

The confocal microscope body 20 further includes a photodetector 12. The confocal microscope body 20 includes a tube lens 10 and a confocal diaphragm 11, in addition to the objective lens 6a, the projection lens 4, the two-dimensional deflector 3, and the beam splitter 2, on a detected light path through which a laser beam reflected by the specimen 15 reaches the photodetector 12.

The tube lens 10, the confocal diaphragm 11, and the photodetector 12 are provided on a reflected light path through which a laser beam reflected by the beam splitter 2 proceeds. The confocal diaphragm 11 is arranged in such a way that a pinhole provided in the confocal diaphragm 11 is located in a focal position of the tube lens 10. The photodetector 12 arranged in a rear stage of the confocal diaphragm 11 is, for example, a photomultiplier (PMT), an avalanche photodiode (APD), or the like.

The confocal microscope body 20 further includes an amplifier 13 that amplifies an analog signal that is output from the photodetector 12, and an AD converter 14 that converts the analog signal amplified by the amplifier 13 into a digital signal.

An amplification factor in the amplifier 13 is determined according to an input from the controller 30. Specifically, the amplification factor is determined, for example, according to a voltage applied to the amplifier 13. In this example, an example is illustrated in which the amplification factor of the analog signal that is output from the photodetector 12 is changed by the amplifier 13 that is separate from the photodetector 12. However, the amplification factor of an analog signal may be changed by changing an amplification factor in the photodetector 12, namely, the amplification factor of an analog signal to be output from the photodetector 12. As an example, the controller 30 may change the amplification factor by changing a voltage applied to a photomultiplier or an avalanche photodiode that is the photodetector 12. The AD converter 14 converts the analog signal amplified by the amplifier 13 into a digital signal (a luminance signal) of 12 bits or 16 bits, for example, and outputs the digital signal to the controller 30.

The confocal microscope body 20 having the configuration above scans the specimen 15 under the control of the controller 30, and outputs, to the controller 30, a signal according to an amount of reflected light from the specimen 15 that has been detected by the photodetector 12, and a displacement amount that has been measured by the displacement gauge 7.

The controller 30 includes a sampling unit 31 and the drive unit 32. The sampling unit 31 is, for example, an electric circuit, and the sampling unit 31 controls a sampling timing of the AD converter 14 according to a signal from the drive unit 32. In addition, the sampling unit 31 generates the image data of a confocal image on the basis of a signal from the confocal microscope body 20, and outputs the image data to the computer 40. Further, the sampling unit 31 converts the displacement amount that has been measured by the displacement gauge 7 into coordinate information in the Z-direction (hereinafter referred to as Z-position information), and the sampling unit 31 outputs the Z-position information to the computer 40.

The drive unit 32 is, for example, an electric circuit, and the drive unit 32 controls the confocal microscope body 20 in accordance with an instruction that a user of a microscope has input to the computer 40 by using an instruction unit 47. As an example, the drive unit 32 controls the two-dimensional deflector 3 and the Z-scanning stage 8 in order to scan the specimen 15. The drive unit 32 also controls the laser 1, the photodetector 12, and the amplifier 13 in order to change a setting relating to brightness (hereinafter referred to as a brightness setting) of a confocal image of the specimen 15 that has been obtained by the confocal microscope apparatus 100. Further, the drive unit 32 controls the revolver 5 in order to switch objective lenses.

The computer 40 is a computing device that includes a computer body 41, a display unit 46, and the instruction unit 47. The computer body 41 includes an image input unit 42, a storage 43, a computing processor 44, and an interface 45.

The image input unit 42 includes a circuit that receives an input of the image data of a confocal image from the controller 30. The image input unit 42 is, for example, a frame grabber board, a USB interface board, or the like that receives image data. Examples of the storage 43 include a hard disk drive, a semiconductor memory, and the like. Image data, such as a confocal image or an omnifocal image (also called an extended focus image), and other data are stored in the storage 43.

Examples of the computing processor 44 include a central processing unit (CPU), a graphics processing unit (GPU) provided on a graphic board, and the like. The computing processor 44 executes a program stored in the storage 43 so as to perform various arithmetic operations. Specifically, as an example, the measurement of a three-dimensional shape (the height of a surface) of the specimen 15, the construction of a stitched image, and the like are performed according to the image data of a confocal image that has been input from the controller 30, and the Z-position information. The interface 45 includes a circuit that communicates necessary data between the computer 40 and another device.

The display unit 46 displays an image, a measurement condition, a measurement result, and the like. The display unit 46 is a display such as a liquid crystal display, an organic electro-luminescence (EL) display, or a cathode ray tube (CRT) display. The instruction unit 47 is a device used for a user of a microscope to input an instruction to the computer 40. Examples of the instruction unit 47 include a keyboard, a mouse, and the like. The display unit 46 and the instruction unit 47 may be incorporated into the computer 40, or may be devices that are independent of the computer 40.

A method for obtaining the image data of a confocal image that is performed by the confocal microscope apparatus 100 is described next. A laser beam emitted from the laser 1 passes through the beam splitter 2, and enters the projection lens 4 via the two-dimensional deflector 3. The laser beam that has entered the projection lens 4 as parallel light is converted into a laser beam having the diameter of a light flux enlarged, and enters the objective lens 6a. The laser beam is collected on a front-side focal plane of the objective lens 6a in a spot shape due to the refractive power of the objective lens 6a, and is applied to the specimen 15 that is arranged near the front-side focal position of the objective lens 6a.

The focusing position of the laser beam on the front-side focal plane is determined according to a direction in which the laser beam is deflected by the two-dimensional deflector 3. Therefore, by controlling the deflection angle $\theta_x$ and the deflection angle $\theta_y$ of the laser beam in the two-dimensional deflector 3, the focusing position of the laser beam is changed in the X-direction and the Y-direction on the focal plane. In the confocal microscope apparatus 100, the controller 30 (the drive unit 32) controls the two-dimensional deflector 3, for example, in such a way that raster scanning is performed. By doing this, the specimen 15 is two-dimensionally scanned.

A laser beam reflected by the specimen 15 enters the two-dimensional deflector 3 via the objective lens 6a and the projection lens 4. The laser beam deflected toward the beam splitter 2 by the two-dimensional deflector 3 is reflected by the beam splitter 2, and enters the confocal diaphragm 11 via the tube lens 10. Only a laser beam that has passed through the pinhole provided in the confocal diaphragm 11 is detected by the photodetector 12.

The photodetector 12 outputs an analog signal according to an amount of the detected laser beam to the amplifier 13. The AD converter 14 converts the analog signal amplified by the amplifier 13 into a digital signal, and outputs the digital signal to the controller 30. The digital signal input from the AD converter 14 to the controller 30 indicates a luminance value (luminance information) that corresponds to a current focusing position of the laser beam.

In the confocal microscope apparatus 100, a luminance value is obtained in each focusing position that is changed by the controller 30 controlling the two-dimensional deflector 3, and the obtained luminance values are two-dimensionally mapped such that a confocal image is obtained. Namely, the controller 30 sets the luminance values obtained in the respective focusing positions to be the pixel values of pixels that correspond to the respective focusing positions so as to generate the image data of a confocal image. The image data of the confocal image generated by the controller 30 is output to the image input unit 42 of the computer 40, is stored in the storage 43, and is displayed on the display unit 46.

Figure 2:
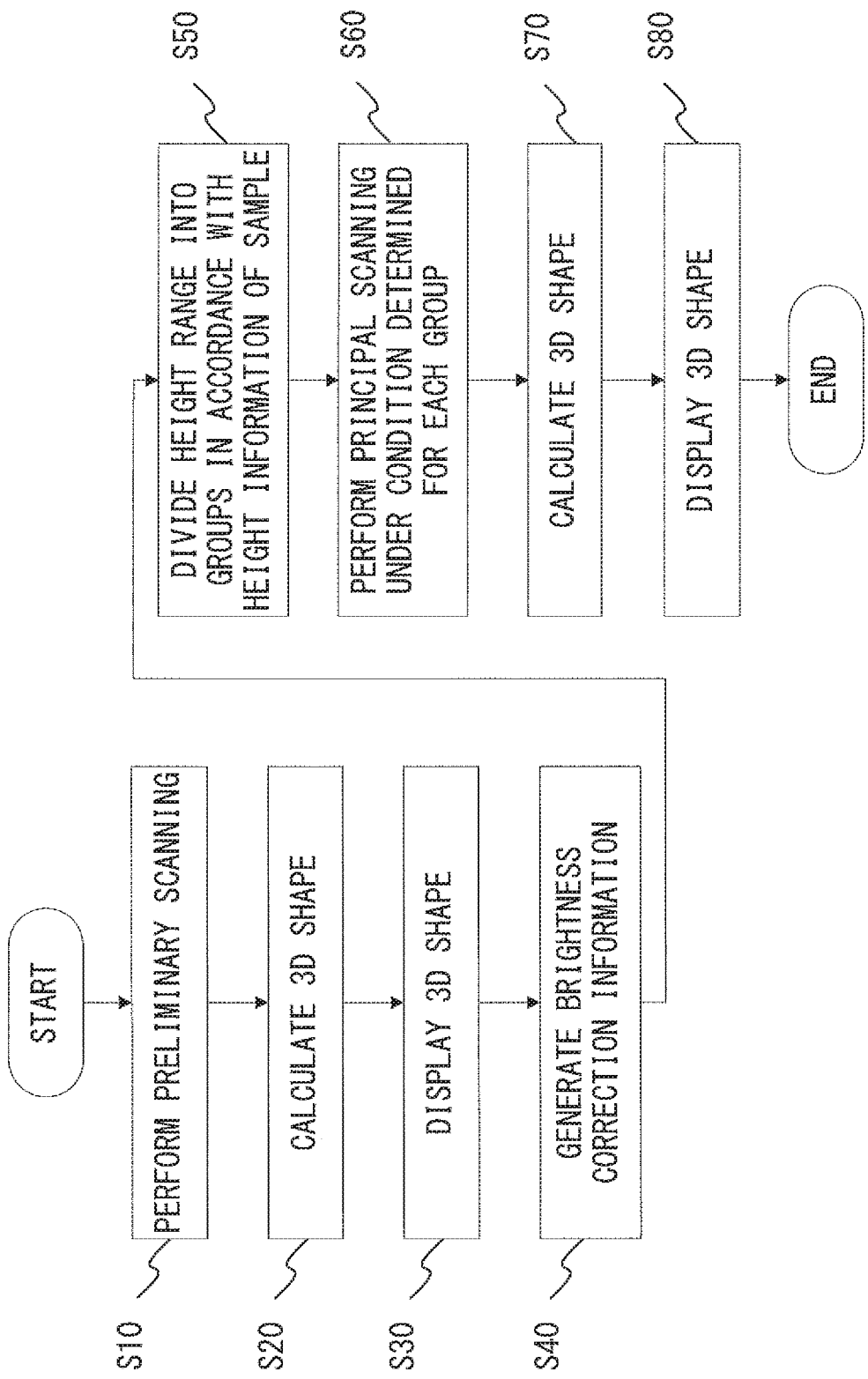
FIG. 2 is a flowchart of the shape measurement processing according to the first embodiment.

FIG. 2 is a flowchart of the shape measurement processing according to this embodiment that is performed by the confocal microscope apparatus 100. As an example, a user who is observing the specimen 15 by using the confocal image displayed on the display unit 46 performs a prescribed operation such that a shape measurement program stored in the storage 43 is executed by the computing processor 44, and the shape measurement processing illustrated in FIG. 2 is started by the confocal microscope apparatus 100.

The confocal microscope apparatus 100 first performs preliminary scanning (step S10). Here, the controller 30 that has received an instruction from the computer 40 controls the confocal microscope body 20 so as to perform preliminary scanning. Preliminary scanning is three-dimensional scanning that is performed prior to principal scanning for obtaining data to measure a detailed shape of the specimen 15. Preliminary scanning is performed in order to roughly grasp the shape of the specimen 15. The data to measure the shape includes at least the image data of a plurality of confocal images and the Z-position information. Hereinafter, a three-dimensional area in which preliminary scanning is performed is referred to as a preliminary scanning area.

FIG. 3A to FIG. 3C are diagrams explaining the operation of the objective lens 6a during preliminary scanning. FIG. 4A to FIG. 4D are diagrams explaining a difference in a scanning mode between principal scanning and preliminary scanning. Preliminary scanning is described below with reference to FIG. 3A to FIG. 3C and FIG. 4A to FIG. 4D.

In step S10, the controller 30 first controls the Z-scanning stage 8 such that the objective lens 6a is brought closer to the specimen 15 by length L1 from the state illustrated in FIG. 3A in which a focal plane FP of the objective lens 6a is located on the surface of the specimen 15. By doing this, the focal plane FP moves from the surface of the specimen 15 to a position in the interior of the specimen 15, as illustrated in FIG. 3B. Here, length L1 is a length that is determined in advance for each of the objective lenses to be used in preliminary scanning. Length L1 may be determined according to the specification of the objective lens, and as an example, length L1 may be ¼ of the working distance (WD) of the objective lens, or may be 100 times the depth of focus. Length L1 can be set to be large within a range in which the objective lens does not come into contact with the specimen 15, and may be a length that is determined in advance by a user of a microscope.

The controller 30 controls the Z-scanning stage 8 to move the objective lens 6a by length L2 (>length L1) at a constant speed in a direction away from the specimen 15 until the focal plane FP is located sufficiently above the surface of the specimen 15, as illustrated in FIG. 3C. Length L2 is a length that is determined in advance for each of the objective lenses to be used in preliminary scanning, similarly to length L1. Length L2 may also be determined according to the specification of the objective lens, and as an example, length L2 may be ½ of the working distance (WD) of the objective lens, or may be 200 times the depth of focus. Any length may be employed if the focal plane FP of the objective lens moves to a position higher than the surface of the specimen 15. Accordingly, the controller 30 may move the objective lens to the Z-position that a user of a microscope has previously set instead of moving the objective lens by length L2.

The controller 30 controls the two-dimensional deflector 3 so as to scan the specimen 15 during a period during which the controller 30 is controlling the objective lens 6a so as to move farther from the specimen 15 (namely, during a period from the state of FIG. 3B to the state of FIG. 3C), and obtains a confocal image at an increased frame rate. The increased frame rate refers to a frame rate that is higher than the frame rate in principal scanning described later. The frame rate is an index indicating how many confocal images can be obtained per second, and the frame rate indicates the speed of two-dimensional scanning in a direction orthogonal to the optical axis of the objective lens. The image data of the confocal image obtained by the controller 30 and the Z-position information are output to the computer 40, and are stored in the storage 43.

Figure 4A:
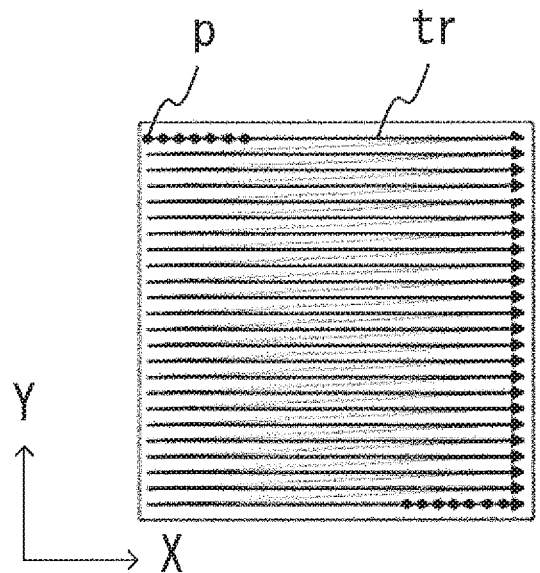
FIG. 4A to FIG. 4D are diagrams explaining a difference in a scanning mode between principal scanning and preliminary scanning.
Figure 4B:
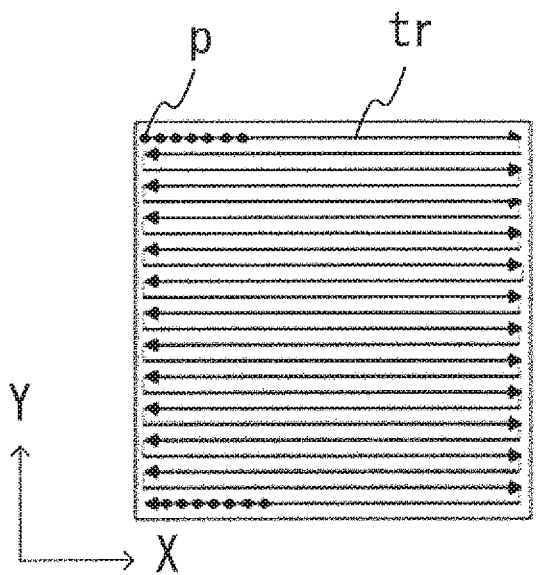
Figure 4C:
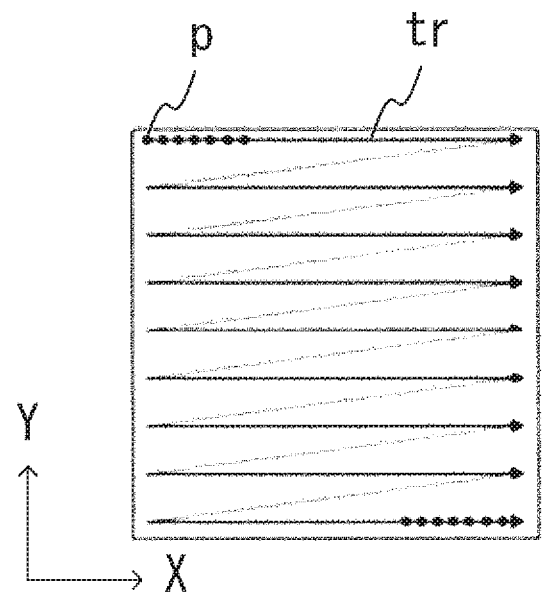
Figure 4D:
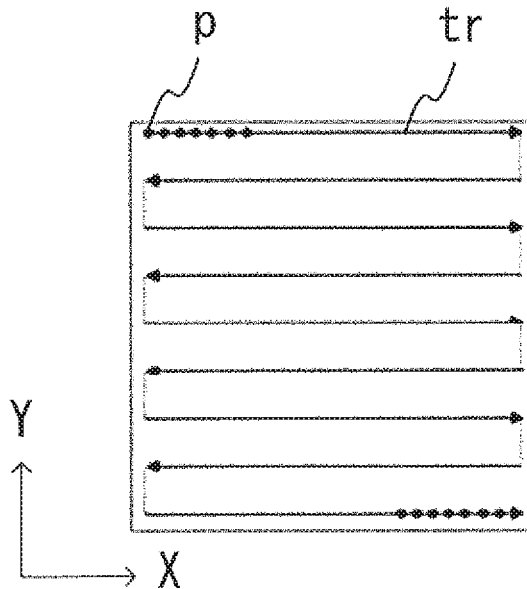

In preliminary scanning, in order to increase the frame rate, the controller 30 controls the two-dimensional deflector 3 in such a way that scanning along the scanning loci illustrated in FIG. 4B to FIG. 4D, for example, is performed. In contrast, in principal scanning, the controller 30 controls the two-dimensional deflector 3 in such a way that raster scanning, as illustrated in FIG. 4A, is performed.

FIG. 4B illustrates an example in which reciprocating scanning in the X-direction is performed. FIG. 4C illustrates an example in which sparse scanning in which lines to be scanned in the Y-direction are thinned out is performed. FIG. 4D illustrates an example in which reciprocating scanning and sparse scanning are combined. In each of FIG. 4A to FIG. 4D, position P indicates a sampling position, and line tr indicates a scanning locus.

By performing preliminary scanning in the scanning mode illustrated in FIG. 4B, the frame rate can be increased to about 2 times the frame rate of principal scanning performed in the scanning mode illustrated in FIG. 4A. By preliminary scanning in the scanning mode illustrated in FIG. 4C in which every 5 lines are scanned, the frame rate can be increased to about 5 times the frame rate of principal scanning. By performing preliminary scanning in the scanning mode illustrated in FIG. 4D, the frame rate can be increased to about 10 times the frame rate of principal scanning.

As described above, as an example, by performing preliminary scanning in a scanning mode in which the frame rate is increased, as in the scanning modes illustrated in FIG. 4B to FIG. 4D, a preliminary scanning area is scanned at a high speed, and data that is sufficient to roughly grasp the shape of the specimen 15 can be obtained.

The speed of movement v of an objective lens may be determined such that an interval (hereinafter referred to as a slice interval) $\Delta z$ in the optical-axis direction between confocal images obtained in preliminary scanning is a length that is determined in advance for each objective lens to be used in preliminary scanning. The slice interval $\Delta z$ may be determined according to the specification of the objective lens, and the slice interval $\Delta z$ may be, for example, ⅕ of the depth of focus. Therefore, the speed of movement v of the objective lens is determined according to the slice interval $\Delta z$ and frame rate F1 in preliminary scanning. As an example, when frame rate F1 is 30 frames per second and $\Delta z$ is 1 μm, the controller 30 can move the objective lens 6a such that v=30 μm/sec is established.

When image obtainment has been completed, the controller 30 may move the objective lens 6a to the position illustrated in FIG. 3A, or may start the subsequent processing while the state illustrated in FIG. 3C is maintained.

When preliminary scanning has been completed, the confocal microscope apparatus 100 calculates a 3D shape on the basis of the data obtained in preliminary scanning (step S20). Here, the computer 40 calculates the 3D shape of the specimen 15 on the basis of a plurality of confocal images stored in the storage 43 and the Z-position information.

Figure 5:
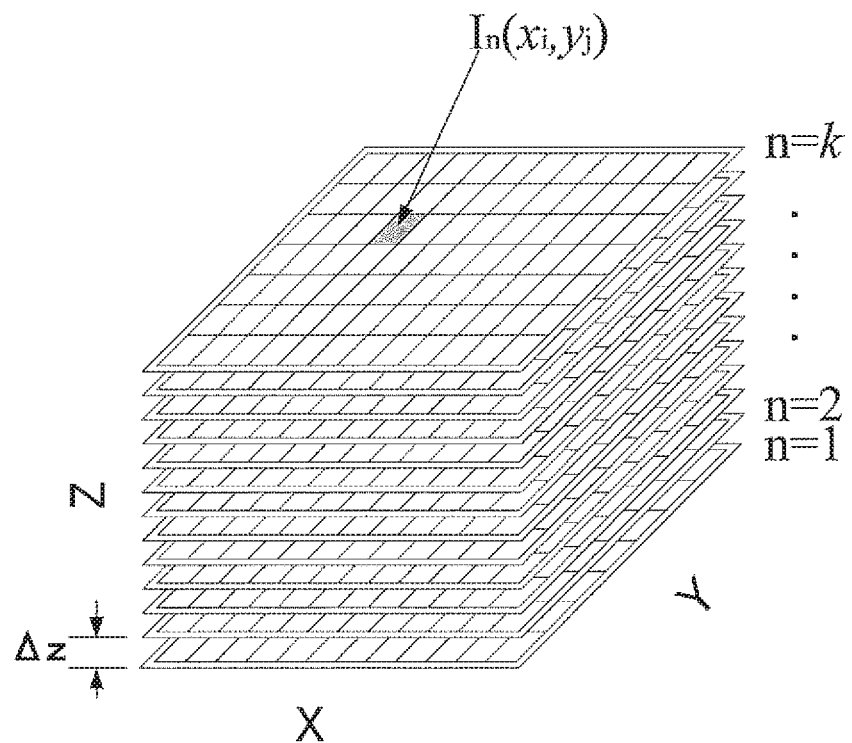
FIG. 5 illustrates the image data of a plurality of confocal images obtained by the confocal microscope apparatus 100.
Figure 6:
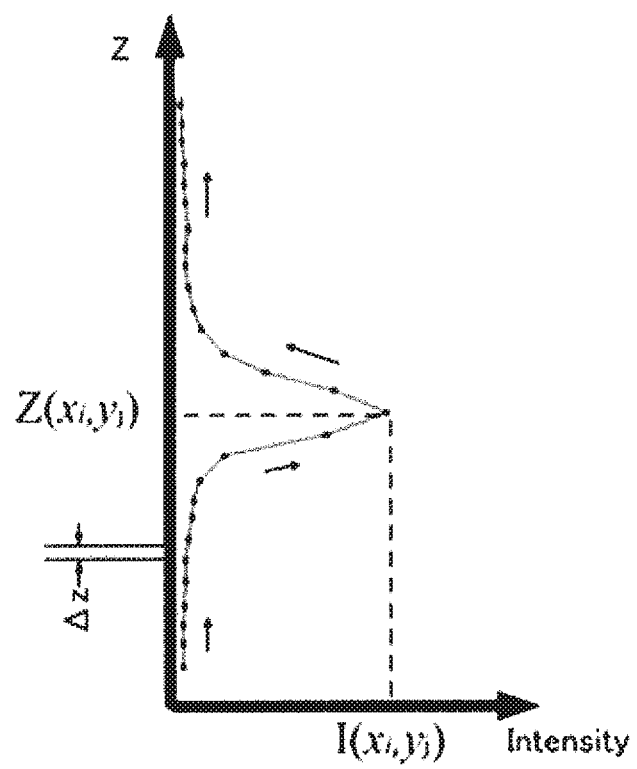
FIG. 6 illustrates a luminance change curve generated by the confocal microscope apparatus 100.

FIG. 5 illustrates the image data of a plurality of confocal images obtained by the confocal microscope apparatus 100. FIG. 6 illustrates a luminance change curve generated by the confocal microscope apparatus 100. A shape calculation method is described below in detail with reference to FIG. 5 and FIG. 6.

In the confocal microscope apparatus 100, when a relative length between the XY-scanning stage 9 and the objective lens 6a is changed, an amount of reflected light (namely, luminance) from a point on the specimen 15 that has been detected by the photodetector 12 changes. The locus of a change in the luminance has an approximately fixed shape according to the numerical aperture of the objective lens 6a, the wavelength of a laser beam, and the size of an aperture (a pinhole) of the confocal diaphragm 10. Hereinafter, the locus of a change in the luminance described above is referred to as a luminance change curve.

In step S20, in order to calculate the shape of the specimen 15, the computing processor 44 first generates a luminance change curve in each XY-position (namely, for each pixel) on the basis of the image data of a plurality of confocal images obtained in different Z-positions.

The storage 43 stores the image data of k confocal images, as illustrated in FIG. 5. Image numbers 1 to k (k is a natural number) are assigned to the respective confocal images. A luminance value, which is luminance information, of each of the pixels in a confocal image having image number n is expressed by the luminance value $I_n(x_i, y_j)$. The luminance value is also referred to as a luminance gradation. Here, $x_i$ and $y_j$ respectively indicate a position in the X-direction (an X-position) and a position in the Y-direction (a Y-position) within a target image. In addition, the Z-position information is allocated to at least each of the k confocal images.

A case in which a luminance change curve in a certain position $(x_0, y_0)$ is generated is described with reference to FIG. 6. First, the luminance value of a pixel at the position $(x_0, y_0)$ is obtained from each of the obtained k confocal images. These luminance values (i.e. intensities) are plotted on the I-Z space in which a horizontal axis indicates the luminance value (I) and a vertical axis indicates the Z-position (Z), and intervals between the plotted points are interpolated such that a luminance change curve is generated. The black points illustrated in FIG. 6 indicate the plotted points. The Z-positions of these points are determined according to the Z-position information allocated to each of the confocal images.

The computing processor 44 may generate the luminance change curve by using the following method. First, a plotted point indicating the greatest luminance value and some points near the point are extracted. An approximate curve is calculated by using the data (the luminance value and the Z-position) of the extracted points, the calculated approximate curve is estimated as the luminance change curve, and the luminance change curve is generated. In this case, in the calculation of the approximate curve, a quadratic polynomial or a higher-order polynomial, or a Gaussian curve is used as a curve to be approximated. As an approximation method to be used, a least-squares method is representative.

When the luminance change curve is generated, the computing processor 44 further specifies a peak luminance value whereby the luminance value becomes the greatest, and a Z-position in which the peak luminance value is obtained (hereinafter referred to as a peak Z-position) in the luminance change curve. This process is also performed in each XY-position, similarly to the process for generating the luminance change curve. By doing this, a peak Z-position distribution $Z(x_i, y_j)$, which indicates a set of peak Z-positions in all of the XY-positions, and a peak luminance value distribution $I(x_i, y_j)$, which indicates a set of peak luminance values in all of the XY-positions, are calculated.

In the confocal microscope apparatus 100, the luminance value becomes the maximum when the surface of the specimen 15 is located in a focusing position of a laser beam (in other words, when the position of the surface of the specimen 15 is a focusing position). Accordingly, the peak Z-position distribution $Z(x_i,y_j)$ indicates a distribution of the height of the surface of the specimen 15 (namely, a surface shape). Therefore, the 3D shape of the specimen 15 can be measured by using the method above for calculating the peak Z-position distribution $Z(x_i, y_j)$. Hereinafter, the peak Z-position distribution $Z(x_i,y_j)$ is referred to as height information.

Figure 7:
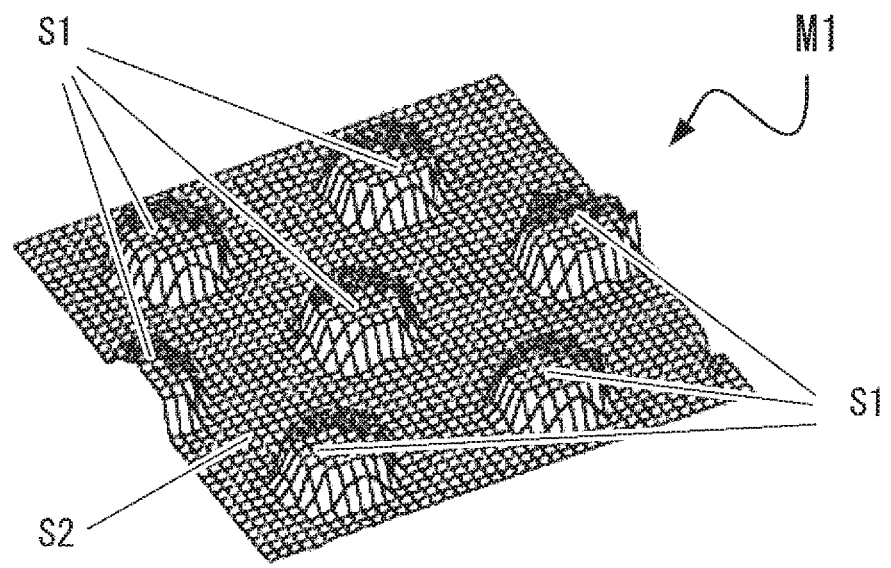
FIG. 7 illustrates an example of an image indicating a rough shape of a specimen 15, that is calculated according to data obtained in preliminary scanning.

When the 3D shape is calculated, the confocal microscope apparatus 100 displays the 3D shape (step S30). Here, the computer 40 causes the display unit 46 to display the 3D shape of the specimen 15 that has been calculated in step S20. FIG. 7 illustrates an example in which the computer 40 causes the display unit 46 to display the 3D shape of the specimen 15 as a bird's-eye view. Image M1 illustrated in FIG. 7 indicates a rough shape of the specimen 15.

The processes of step S10 to step S30 may be performed in parallel. As an example, the luminance change curve may be updated as needed during the movement at a constant speed of the objective lens 6a, and the peak Z-position distribution $Z(x_i,y_j)$ may be calculated as needed. By performing the processing above, for example, preliminary scanning can be terminated when the peak Z-position has been identified for pixels at a specified ratio to the number of pixels in a confocal image. By doing this, the time needed for preliminary scanning can be reduced.

An image displayed on the display unit 46 may be updated according to the peak Z-position distribution $Z(x_i,y_j)$ calculated as needed. By doing this, the progress status of preliminary scanning can be visually grasped. In addition, it is useful for a user of a microscope to deepen their understanding of a measurement flow or principle.

The confocal microscope apparatus 100 generates brightness correction information (step S40). Here, the computer 40 generates the brightness correction information on the basis of the luminance information of plural confocal images obtained in preliminary scanning. The brightness correction information is information that is used in principal scanning described later. The luminance information that is used to generate the brightness correction information is the peak luminance value distribution $I(x_i,y_j)$ calculated in step S20.

Figure 8:
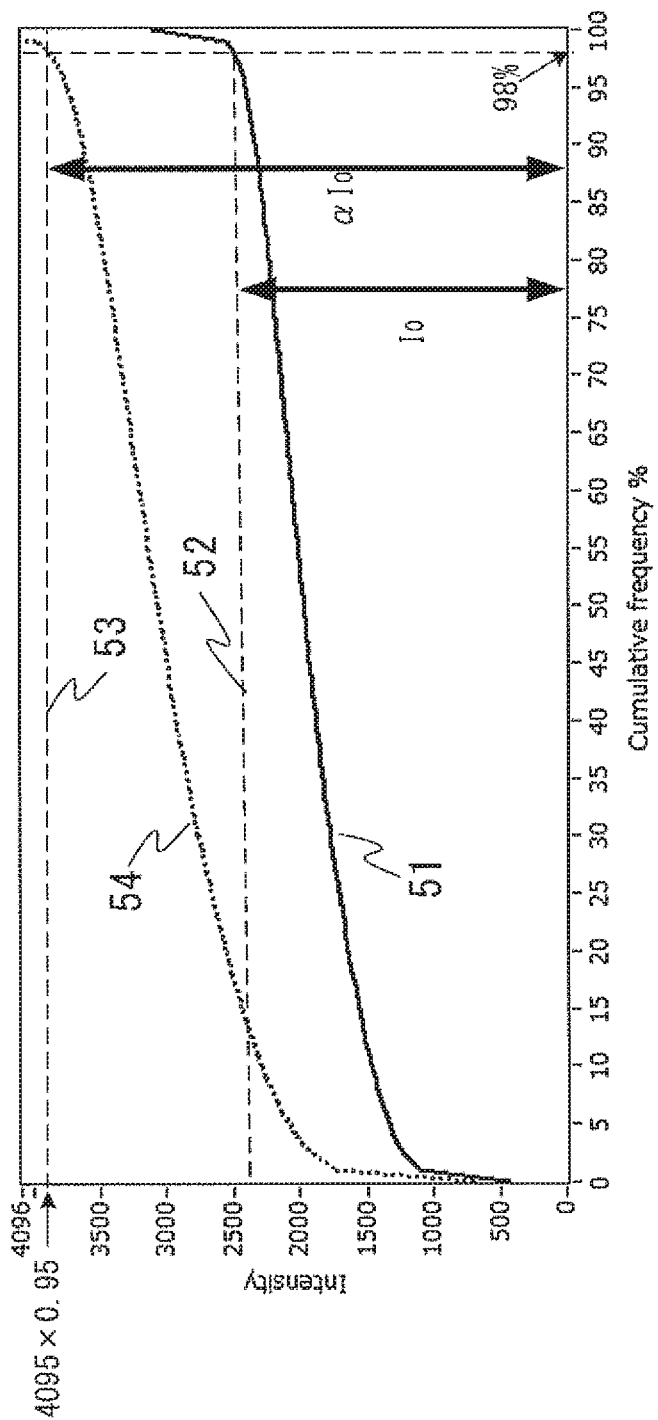
FIG. 8 illustrates a cumulative frequency curve of the maximum luminance value that is generated in order to generate brightness correction information.

FIG. 8 illustrates a cumulative frequency curve of a maximum luminance value that is generated in order to generate the brightness correction information. A method for generating the brightness correction information is described below with reference to FIG. 8. FIG. 8 illustrates an example in a case in which the number of digital gradations of the luminance information is 4096 gradations (12 bits).

The computing processor 44 first calculates a cumulative frequency curve 51 for the maximum luminance value of each pixel on the basis of the peak luminance value distribution $I(x_i,y_j)$. The computing processor 44 calculates a ratio $\alpha$ of a luminance value 52 at which a cumulative frequency in the cumulative frequency curve 51 is 98% and a luminance value 53 that corresponds to 95% of the maximum luminance gradation (=4096×0.95), and the computing processor 44 stores the calculated ratio $\alpha$ as the brightness correction information in the storage 43. A cumulative frequency curve 54 indicates a cumulative frequency curve that is calculated when the cumulative frequency curve 51 is corrected according to the brightness correction information. In the example illustrated in FIG. 8, the brightness correction information is about 1.6.

An example in which a luminance value at which a cumulative frequency is 98% in the cumulative frequency curve 51 is calculated has been described in consideration of the influence of noise, but this value is not limited to 98%, and may be arbitrarily set by a user. A luminance value that corresponds to 95% of the maximum luminance gradation has been used above to calculate the correction information, but the luminance value does not always correspond to 95% of the maximum luminance gradation. The luminance value may correspond, for example, to 100% of the maximum luminance gradation, or may be arbitrarily set by a user. In addition, the brightness correction information is information used to adjust brightness in such a way that the maximum luminance value of an image becomes closer to the number of digital gradations, and it is preferable that the brightness correction information be calculated by using a statistical method. However, a method for calculating the brightness correction information is not limited to the method above.

When the brightness correction information is generated, the confocal microscope apparatus 100 divides a range in a direction of the optical axis of the objective lens 6a of a preliminary scanning area (hereinafter referred to as a preliminary scanning height range or a Z-scanning range) into groups in accordance with the height information of the specimen 15 (step S50). Here, the computer 40 divides the preliminary scanning height range into plural groups in accordance with data that has been obtained by the confocal microscope apparatus 100 performing preliminary scanning. More specifically, the computer 40 divides the preliminary scanning height range into plural groups in accordance with the height information of the specimen 15 that has been calculated in step S20.

Figure 9:
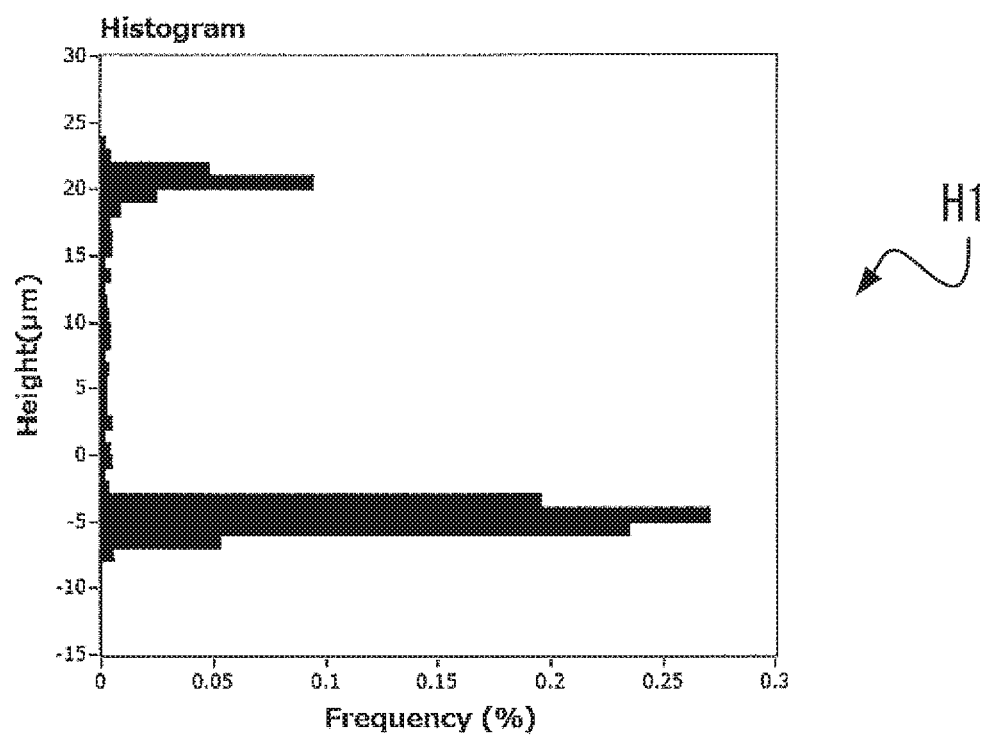
FIG. 9 illustrates histogram H1 of height information that is generated in order to divide a height range into groups.
Figure 10:
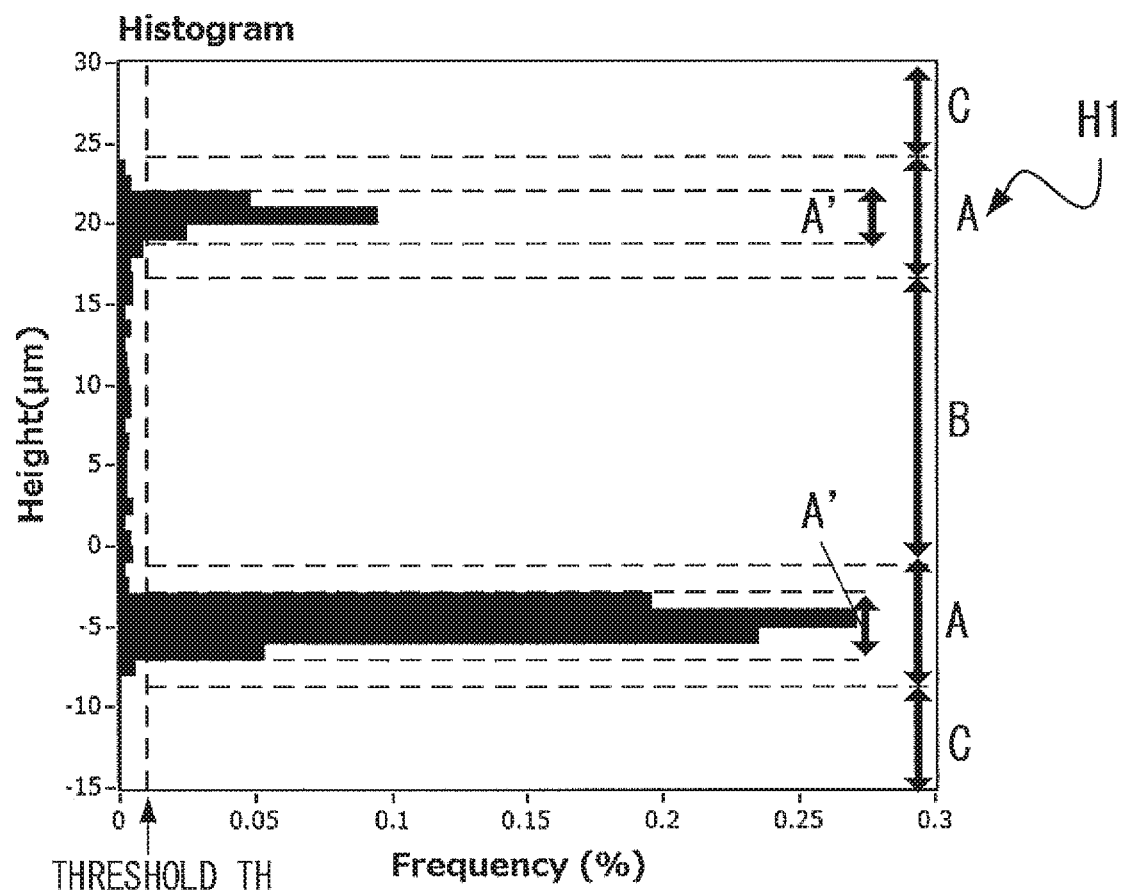
FIG. 10 illustrates an example of the division of the height range into groups according to histogram H1.

FIG. 9 illustrates histogram H1 of height information that is generated in order to divide a height range into groups. FIG. 10 illustrates an example of the division of the height range into groups according to histogram H1. A grouping method is described below in detail with reference to FIG. 9 and FIG. 10. In histogram H1 illustrated in FIG. 9 and FIG. 10, a vertical axis indicates the height (μm) of the specimen 15, and a horizontal axis indicates a frequency (%) with respect to the number of pixels in a confocal image. In histogram H1, it is preferable that a gradation width (a BIN width) be equal to the slice interval $\Delta z$. By making the BIN width coincide with the slice interval, a threshold TH having a fixed value can be used regardless of a sample or a measurement condition. The threshold will be described later.

First, the computing processor 44 generates histogram H1 of the height information that is illustrated in FIG. 9 (namely, a histogram indicating the height of the specimen 15) on the basis of the height information calculated in step S20. Further, the computing processor 44 divides the height range into plural groups in accordance with histogram H1.

As an example, the computing processor 44 specifies a section in which a frequency exceeds the threshold TH in the height range. As illustrated in FIG. 10, this section is categorized as group A', which is a tentative group. A section obtained by adding a preliminary section to both ends of the section categorized as group A' is specified, and the specified section is categorized as group A.

The width of the preliminary section is determined in consideration of the shape of the luminance change curve. As an example, the width of the preliminary section may be the full width at half maximum of the luminance change curve, or may be a length from a peak to a base of the luminance change curve. These differ for each objective lens, and therefore the width of the preliminary section may be determined for each of the objective lens. By providing the preliminary section, the accuracy of the estimation of the luminance change curve based on the data obtained in principal scanning is improved. Therefore, the accuracy of height measurement can be improved.

Further, in a case in which plural sections categorized as group A exist in a state in which the sections are separated from each other, a section between the plural sections that has a frequency smaller than the threshold TH is categorized as group B, as illustrated in FIG. 10. In addition, a section that is located between a section categorized as group A and an upper limit of the height range and a section that is located between another section categorized as group A and a lower limit of the height range are categorized as group C.

When the division of the height range into groups has been finished, the confocal microscope apparatus 100 performs principal scanning under a condition determined for each of the groups (step S60). Principal scanning is three-dimensional scanning for obtaining data to measure a detailed shape of the specimen 15.

In step S60, the computer 40 first determines a measurement condition for each of the groups. The measurement condition refers to prescribed setting items of the confocal microscope apparatus 100 at the time of obtaining an image for shape measurement, such as scanning speed or brightness setting. In this example, the measurement condition includes the scanning speed in a direction of the optical axis of an objective lens (namely, the speed of movement of the Z-scanning stage 8; hereinafter referred to as a Z-scanning speed). The computer 40 determines the Z-scanning speeds for group A and group B to be speed va and speed vb, respectively. In this example, principal scanning is not performed in the section categorized as group C. Therefore, the Z-scanning speed vc for group C is not determined.

Speed va is determined to be, for example, a speed that is calculated from a frame rate F2 of principal scanning and a desired slice interval $\Delta z$ in principal scanning such that va=F2×$\Delta z$ is established. The frame rate F2 of principal scanning is a frame rate that is lower than the frame rate F1 of preliminary scanning, as described above. The desired slice interval $\Delta z$ in principal scanning may be different from the slice interval in preliminary scanning. In addition, speed vb is determined to be a speed that is higher than speed va, for example, such that vb=3×va is established.

The controller 30 controls the confocal microscope body 20 to perform principal scanning. In principal scanning, the confocal microscope body 20 is controlled by the controller 30 so as to scan at least a portion of the preliminary scanning area under the measurement condition determined for each of the groups. In this example, sections excluding the sections categorized as group C are scanned. FIG. 11 illustrates a relationship between groups and a scanning speed in an optical-axis direction in principal scanning. An example of control performed by the controller 30 on the confocal microscope body 20 in principal scanning is described below in detail with reference to FIG. 11.

First, the controller 30 moves the objective lens 6a from the Z-position zs in which preliminary scanning has been finished to the Z-position z1 at the bottom of the section categorized as group A at speed v0, as illustrated in group G1. Speed v0 is a relatively high speed, and is, for example, a speed that satisfies the relationship va<vb<v0. The controller 30 obtains a confocal image while moving the objective lens 6a from the Z-position z1 to the Z-position z4 at the top of the section categorized as group A.

More specifically, the controller 30 obtains a confocal image while moving in the sections categorized as group A at a relatively low speed va. Meanwhile, the controller 30 obtains a confocal image while moving in the section categorized as group B at a relatively high speed vb. Stated another way, the controller 30 controls the confocal microscope body 20 such that the Z-scanning speed in principal scanning differs for each of the plural groups.

In addition, the controller 30 constantly obtains a confocal image at the frame rate F2, which is lower than the frame rate F1 in preliminary scanning, during the movement from the Z-position z1 to the Z-position z4. Stated another way, the controller 30 controls the confocal microscope body 20 such that the slice interval in principal scanning differs for each of the plural groups.

Further, the controller 30 controls the confocal microscope body 20 so as to perform principal scanning in a brightness setting that is different from that in preliminary scanning in accordance with the brightness correction information generated in step S40, during the movement from the Z-position z1 to the Z-position z4. Specifically, the controller 30 controls the laser 1, the photodetector 12, and the amplifier 13 so as to adjust at least one of an amount of light emitted from the laser 1 and the amplification factor of an analog signal.

Finally, the controller 30 moves the objective lens 6a from the Z-position z4 to the Z-position zs at speed v0 without obtaining a confocal image, and finishes principal scanning.

When principal scanning has been finished, the confocal microscope apparatus 100 calculates the 3D shape of the specimen 15 (step S70). Here, the computer 40 calculates the shape of the specimen 15 on the basis of data that has been obtained by the confocal microscope body 20 performing principal scanning. A method for calculating a 3D shape is similar to the process of step S20, and the 3D shape is calculated by generating the luminance change curve for each pixel. Here, it is expected that the 3D shape be calculated with a high accuracy, and therefore it is preferable that the luminance change curve be estimated according to the maximum luminance value and some points near the maximum luminance value. By doing this, height can be measured with a scale that is finer than the slice interval.

Figure 12:
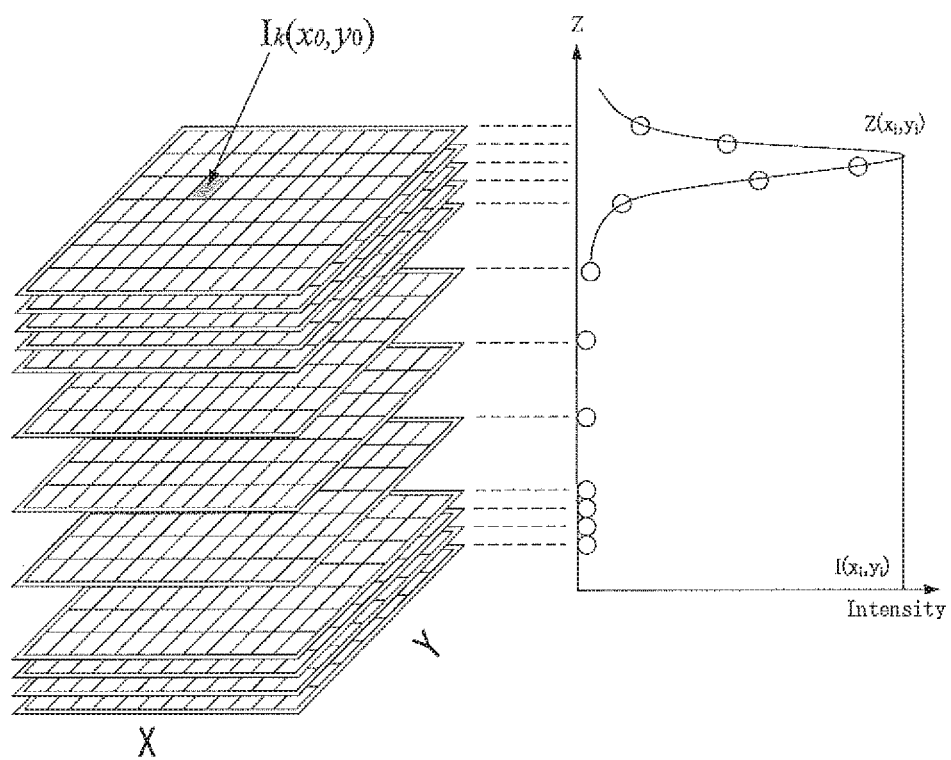
FIG. 12 is a diagram in which the image data of confocal images obtained in principal scanning and a luminance change curve at a certain pixel are arranged.

In principal scanning, the slice interval differs in each of the sections, and therefore the distribution of the Z-position in image data has coarseness and fineness, as shown in FIG. 12. However, in section B in which the slice interval is wide, the surface of the specimen 15 hardly exists. Even when the surface exists in section B, the luminance change curve is approximated according to information relating to plural sampling positions located before and after the surface, and therefore height can be calculated without greatly deteriorating accuracy. Accordingly, the 3D shape of the specimen 15 can be calculated with a high accuracy.

Figure 13:
FIG. 13 illustrates an example of an image indicating a detailed shape of the specimen 15 that is calculated according to data obtained in principal scanning.

When the 3D shape is calculated, the confocal microscope apparatus 100 displays the 3D shape (step S80). Here, the computer 40 causes the display unit 46 to display the 3D shape of the specimen 15 that has been calculated in step S70. FIG. 13 illustrates an example in which the computer 40 causes the display unit 46 to display the 3D shape of the specimen 15 as a bird's-eye view. Image M2 illustrated in FIG. 13 indicates a detailed shape of the specimen 15. The processes of step S60 to step S80 may be performed in parallel, and in that respect, the processing is similar to step S10 to step S30.

In the confocal microscope apparatus 100, preliminary scanning that is not performed in a conventional method is performed within a wide range, and in preliminary scanning, the specimen 15 is scanned in a height direction at a high speed according to the increased frame rate. The Z-scanning speed in principal scanning is determined according to a rough 3D shape of the specimen 15 that has been calculated in preliminary scanning. By doing this, the time needed in principal scanning is reduced, and in particular, in a case in which a wide Z-scanning range in which a surface does not exist exists, the needed time can be greatly reduced. Accordingly, the total scanning time needed from preliminary scanning to principal scanning can be reduced in comparison with a conventional scanning time.

In addition, in the confocal microscope apparatus 100, a principal scanning area is determined according to a result of preliminary scanning performed across a wide range. Therefore, data needed for shape measurement can be obtained without loss in principal scanning.

Further, in the confocal microscope apparatus 100, a scanning area is automatically determined in both principal scanning and preliminary scanning, and a slice interval is also automatically determined. The brightness setting in principal scanning is also automatically adjusted. Therefore, even beginners can scan the specimen 15 by using the confocal microscope apparatus 100 without being bothered by performing setting, and can easily obtain data needed for shape measurement.

In view of the foregoing, by employing the confocal microscope apparatus 100, an area that is sufficient to perform shape measurement with a high reliability can be easily scanned in a short time. In addition, settings are automated, and therefore it is rare to redo measurement, and a user is not confused about settings. For these reasons, shape measurement with a high reliability can be easily performed in a short time. The Z-scanning speed in principal scanning is determined according to a rough 3D shape of the specimen 15. Therefore, the measurement time can be attempted to be reduced while suppressing deterioration of the accuracy of measurement. Namely, shape measurement with a high accuracy in addition to a high reliability can be easily performed in a short time. Further, brightness in principal scanning is adjusted according to a result of preliminary scanning. Therefore, an image can be obtained by using the optimum brightness setting. This respect also contributes to measurement with a high accuracy.

Figure 14:
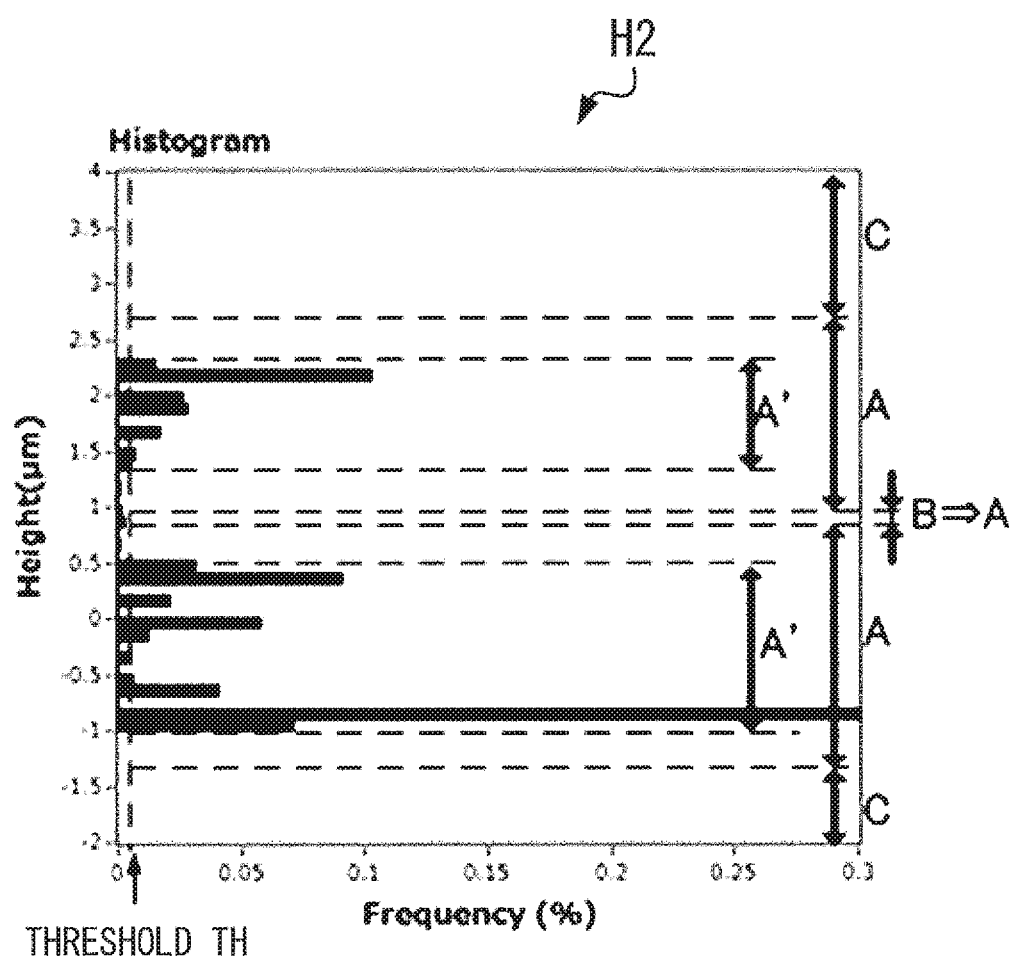
FIG. 14 illustrates an example of the division of a height range into groups according to histogram H2.

A grouping method is not limited to the method above. In this embodiment, an example has been described in which a section obtained by adding a preliminary section to a section in which a frequency exceeds a threshold is categorized as group A, but the section in which the frequency exceeds the threshold without the preliminary section may be categorized as group A. In addition, an example has been described in which a section between groups A that has a frequency smaller than the threshold TH is categorized as group B. However, in a case in which the width of the section between groups A is smaller than a prescribed length, the section may be categorized as group A, as illustrated in FIG. 14. The prescribed length is, for example, 3 times the slice interval Δz. By doing this, a situation can be prevented in which, by frequently changing groups during principal scanning, settings are frequently changed and this results in an increase in the scanning time.

Figure 15:
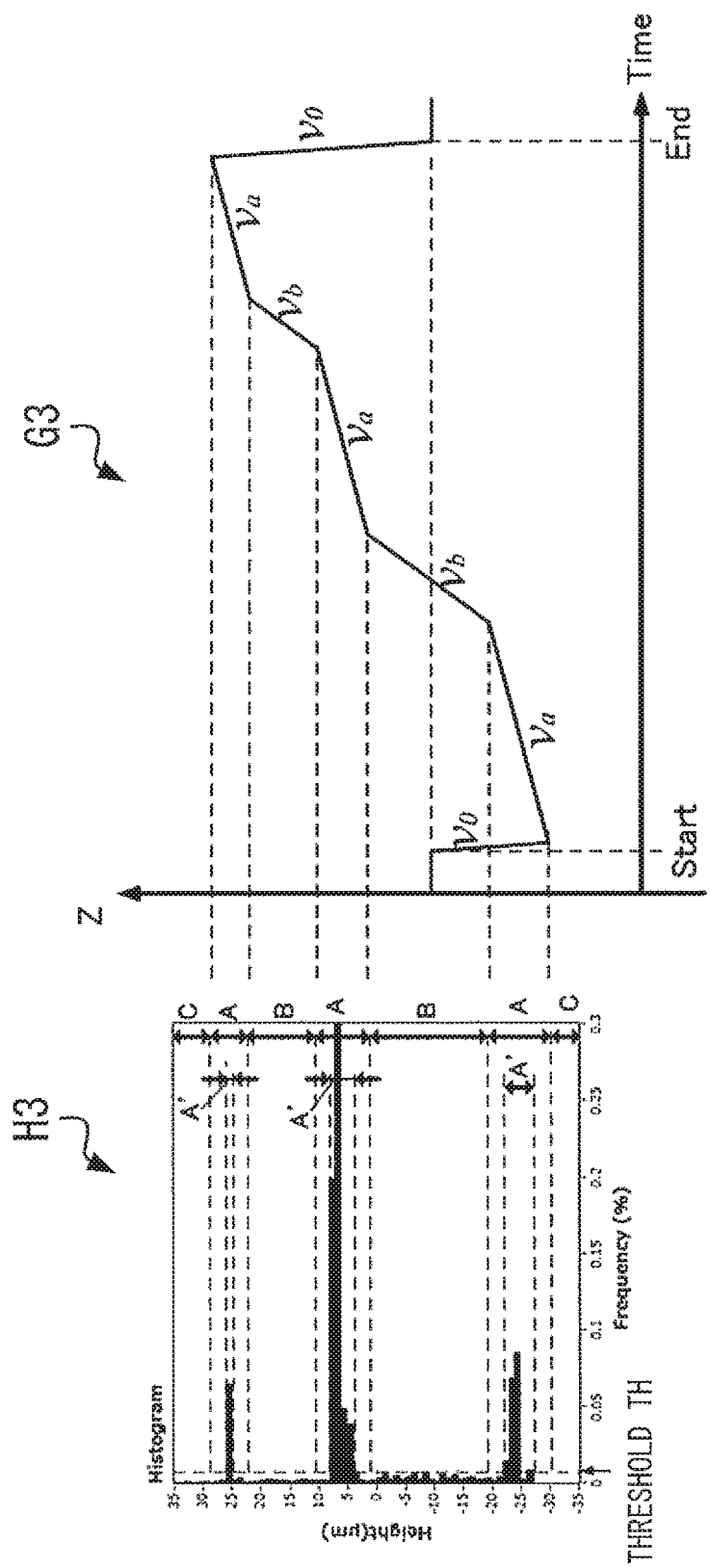
FIG. 15 illustrates another example of a relationship between a group and a scanning speed in an optical-axis direction in principal scanning.
Figure 16:
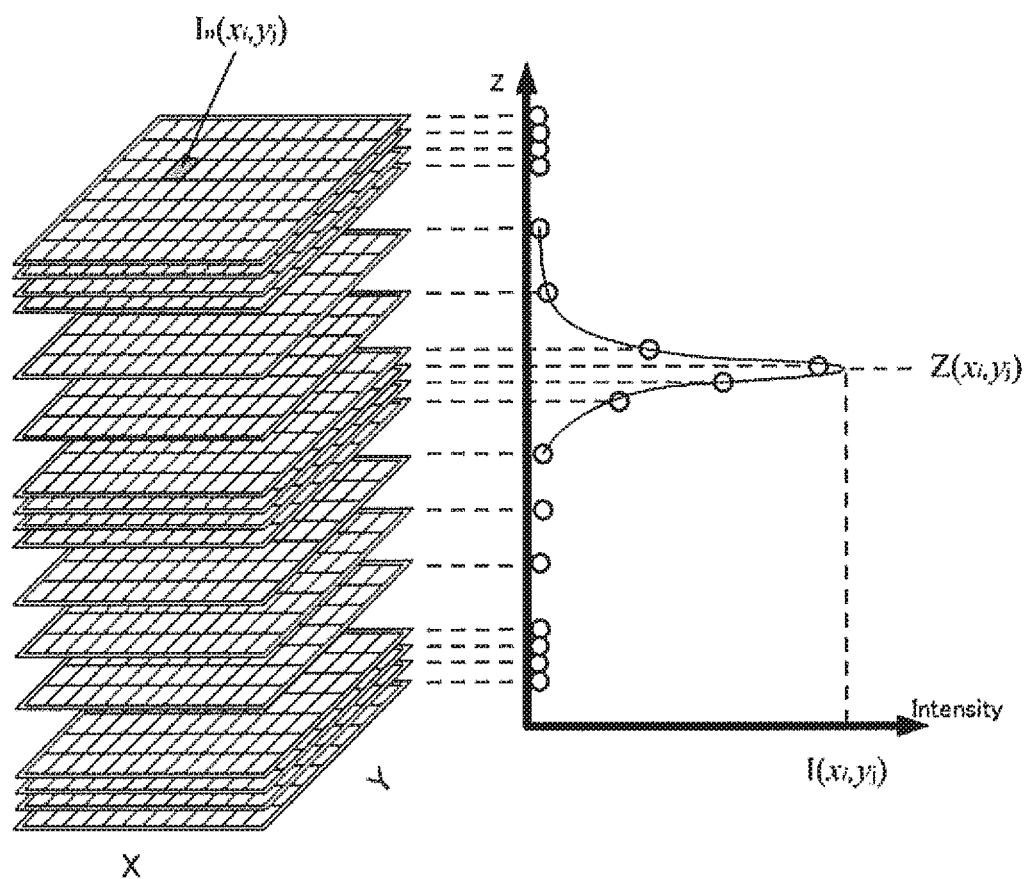
FIG. 16 is another diagram in which the image data of confocal images obtained in principal scanning and a luminance change curve at a certain pixel are arranged.

In this embodiment, histogram H1 in which two sections are categorized as group A, and a section between the two sections is categorized as group B, as illustrated in FIG. 10, has been described as an example, but the number of sections categorized as each of the groups is not particularly limited. As an example, as illustrated in histogram H2 of FIG. 14, one section may be categorized as group A, and no sections to be categorized as group B may exist. Alternatively, as illustrated in histogram H3 of FIG. 15, three or more sections may be categorized as group A, and two or more sections may be categorized as group B. In this case, as illustrated in graph G3 of FIG. 15, the Z-scanning speed is repeatedly changed during principal scanning. Consequently, coarseness and fineness are repeatedly generated in the distribution of the Z-position of image data obtained in principal scanning, as illustrated in FIG. 16.

As illustrated in FIG. 17, when plural sections categorized as group A exist, different pieces of brightness correction information may be used in the respective sections. Namely, a pixel for which a luminance value obtained in preliminary scanning indicates a peak in a corresponding section may be specified in each of the sections, and brightness correction information may be generated according to the peak luminance value of the specified pixel. In FIG. 17, the respective sections categorized as group A are illustrated as A1 and A2 for convenience. By using different pieces of brightness correction information in the respective sections, the brightness setting can be optimized in each of the sections, and therefore the accuracy of height measurement can be further improved. This is particularly effective, for example, in a case in which portion S1 and portion S2 having different heights, as illustrated in FIG. 7, have different reflectances due to a difference in material.

In addition, the computer 40 may perform smoothing processing using a median filter, a Gaussian filter, or the like on height information that is calculated according to data obtained in preliminary scanning. The computer 40 may generate a histogram of the height of the specimen 15 on the basis of the smoothed height information of the specimen 15. When generating the height histogram, the height histogram may be generated by excluding height information of pixels for which a peak luminance value is smaller than a predetermined value. By performing these processes, before grouping is performed, noise included in the data obtained in preliminary scanning or data with a low reliability is excluded. This results in a reduction in erroneous determination in grouping, and shape measurement with a high reliability can be performed.

Second Embodiment

Figure 18:
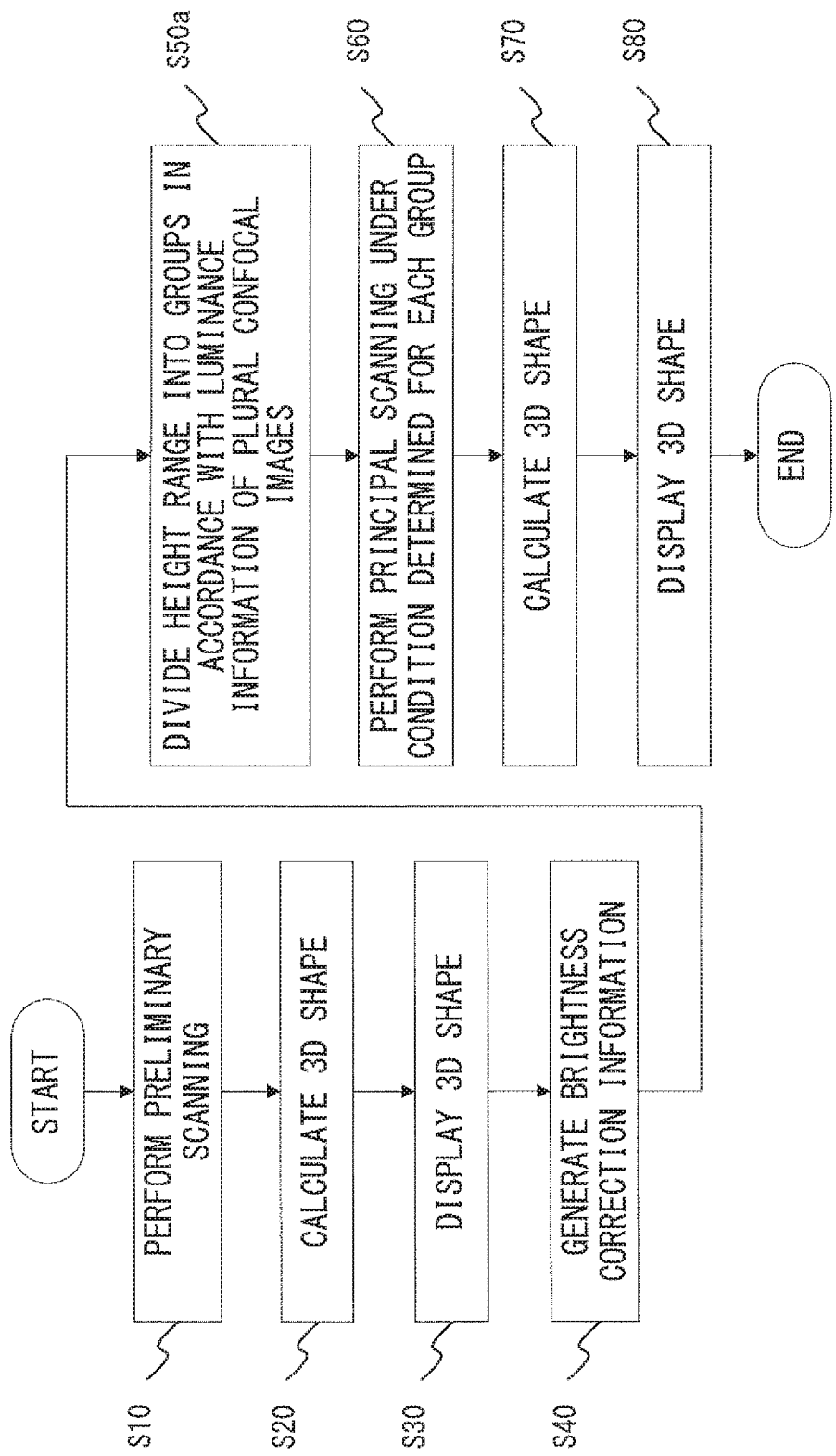
FIG. 18 is a flowchart of the shape measurement processing according to a second embodiment.

FIG. 18 is a flowchart of the shape measurement processing according to this embodiment. The shape measurement processing illustrated in FIG. 18 is performed by a confocal microscope apparatus according to this embodiment (hereinafter simply referred to as a confocal microscope apparatus). The confocal microscope apparatus according to this embodiment has a configuration similar to that of the confocal microscope apparatus 100. Therefore, the configuration of the confocal microscope apparatus is referred to by using the same reference numerals as those in the configuration of the confocal microscope apparatus 100.

The shape measurement processing illustrated in FIG. 18 is similar to the shape measurement processing illustrated in FIG. 2, except that methods for dividing a height range into groups are different from each other. The process of step S50a for dividing a height range into groups is described below.

In step S50a, the computer 40 of the confocal microscope apparatus divides a height range in preliminary scanning into plural groups in accordance with luminance information of a plurality of confocal images that are obtained by the confocal microscope body 20 performing preliminary scanning.

Figure 19:
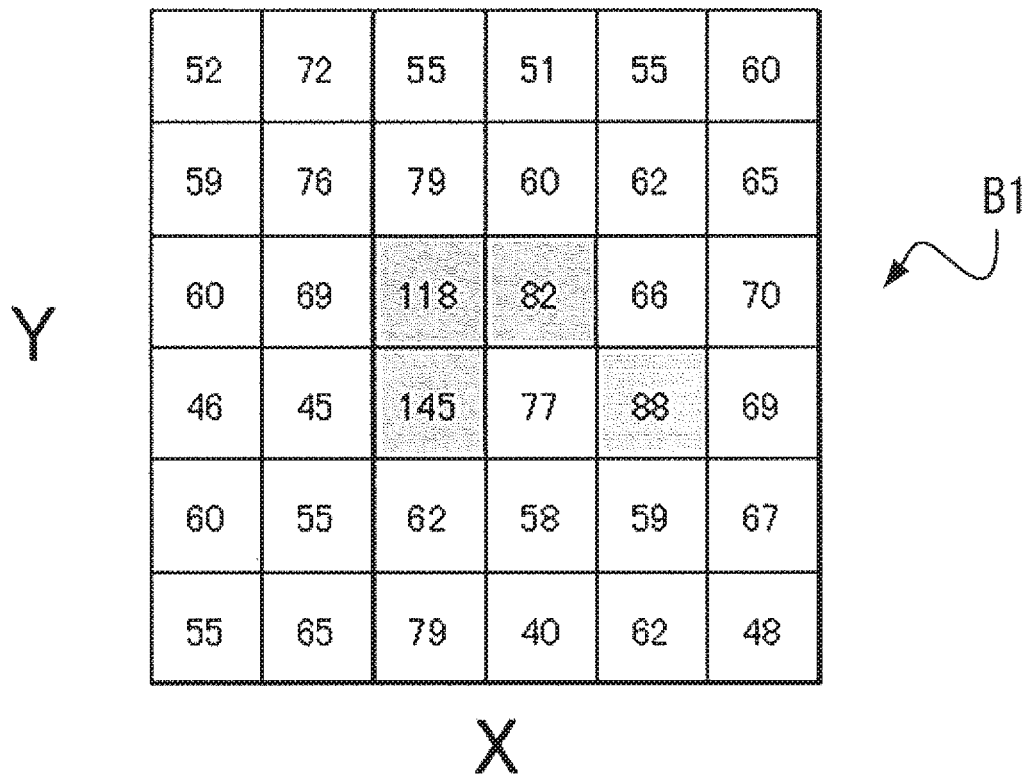
FIG. 19 illustrates an example of the image data of a confocal image obtained in preliminary scanning.

FIG. 19 illustrates an example of the image data of a confocal image obtained in preliminary scanning. FIG. 20 illustrates an example of a table generated in order to divide a height range into groups. A grouping method is described below in detail with reference to FIG. 19 and FIG. 20. The image data illustrated in FIG. 19 is illustrated by using 6×6 pixels for simplification, but an actual number of pixels is often several hundred thousand to several million. A value described in a pixel illustrated in FIG. 19 is a luminance value (also referred to as a luminance gradation) that is luminance information. Hereinafter, assume that the image data of a confocal image is referred to as frame data.

First, the computing processor 44 calculates a ratio of luminance information that is greater than or equal to a threshold with respect to luminance information of each of the confocal images obtained in preliminary scanning. More specifically, the computing processor 44 sequentially reads one piece of frame data, and counts the number of pixels that have a luminance value that exceeds a prescribed threshold. The computing processor 44 calculates, for each piece of frame data, a ratio of the counted number of pixels with respect to the number of pixels in a confocal image. As an example, assume that the prescribed threshold is 80. When the ratio is calculated for frame data B1 illustrated in FIG. 19, the ratio is calculated such that (4/36)×100=11.1%. The prescribed threshold may be set to a value near a lower limit value of a brightness that is sufficient to be regarded as a signal obtained by detecting reflected light from the specimen 15.

The computing processor 44 divides a height range in preliminary scanning into plural groups in accordance with the ratio of pixels that exceed the prescribed threshold that has been calculated for each piece of frame data. More specifically, a section in which the ratio of pixels that exceed the prescribed threshold is greater than or equal to a specified ratio within the height range in preliminary scanning is specified. As illustrated in table T1 of FIG. 20, this section is categorized as group A', which is a tentative group. A section obtained by adding a preliminary section at both ends of the section categorized as group A' is specified, and the section is categorized as group A. In this example, the specified ratio used as a threshold is 0.01%, but this ratio may be arbitrarily set by a user.

Finally, when plural sections categorized as group A exist in a state in which the plural sections are separated from each other, the computing processor 44 categorizes a section between the plural sections as group B, and categorizes a section between a section categorized as group A and an upper limit of the height range and a section between another section categorized as group A and a lower limit of the height range as group C, as illustrated in table T1 of FIG. 20.

Also by employing the confocal microscope apparatus according to this embodiment in which grouping is performed according to the luminance information of plural confocal images, effects similar to those of the confocal microscope apparatus 100 can be achieved. In this embodiment, a process for generating a height histogram at the time of grouping can be omitted. Therefore, an operation amount is reduced, and grouping can be performed at a high speed.

Figure 21:
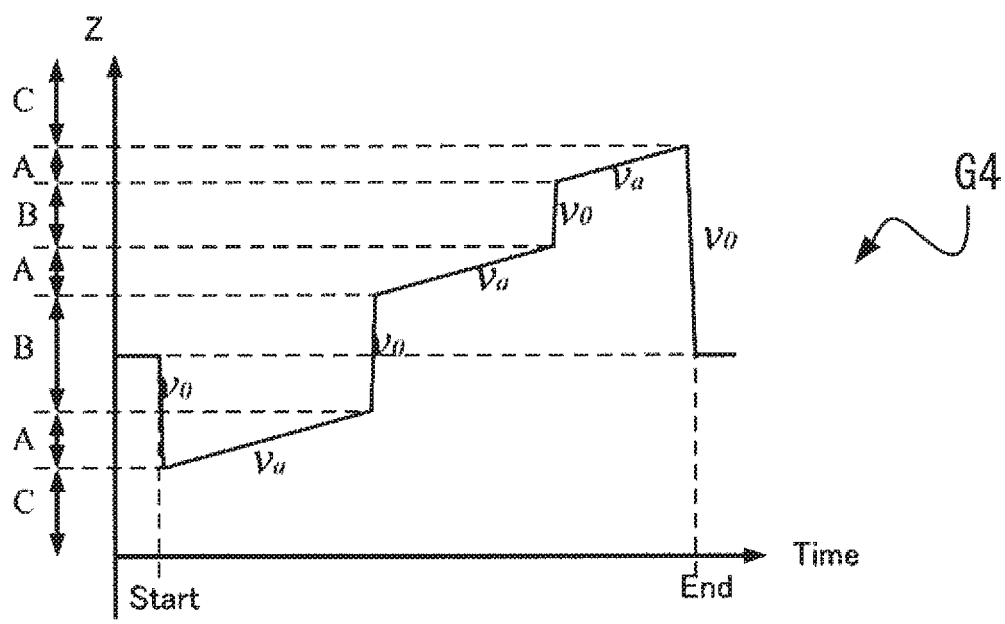
FIG. 21 illustrates an example of a change in a scanning speed in an optical-axis direction during principal scanning.

In the embodiment described above, an example in which a confocal image is obtained in a section categorized as group B has been described, but in the section categorized as group B, a confocal image does not always need to be obtained similarly to the section categorized as group C. Namely, the computing processor 44 may set sections other than the sections categorized as group A in the preliminary scanning area to be located outside the principal scanning area. In this case, the computing processor 44 may set the Z-scanning speed of group B to speed v0, which is the same as a speed at the time of the movement to a Z-position that is located at the bottom of the sections categorized as group A, as illustrated in graph G4 of FIG. 21.

Figure 22:
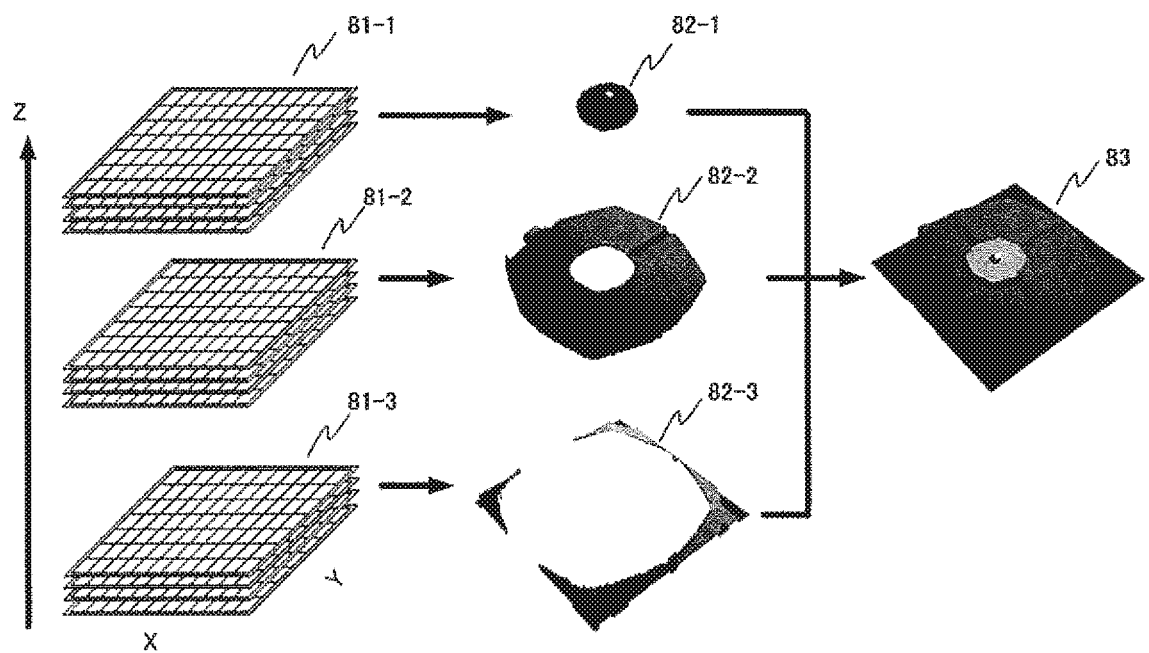
FIG. 22 is a diagram explaining a method for generating a three-dimensional image from the image data of a confocal image obtained in principal scanning.

When principal scanning is performed by using the setting above, a confocal image is obtained only in the sections categorized as group A, as illustrated in FIG. 22. The computing processor 44 may calculate a 3D shape in each of the sections in accordance with the image data of a confocal image obtained in each of the sections (hereinafter referred to as a frame data group), and may combine the 3D shapes calculated in the respective sections so as to calculate the 3D shape of the entirety of the specimen 15. FIG. 22 illustrates an example in which three 3D shapes 82-1, 82-2, and 82-3 are calculated from three frame data groups 81-1, 81-2, and 81-3. The three 3D shapes are calculated on the same coordinate system, and therefore a 3D shape 83 indicating the entirety of the specimen 15 can be calculated by simply superimposing the three 3D shapes onto each other.

By omitting the obtainment of an image in group B, the principal scanning area can be scanned in a shorter time. Therefore, the time needed to measure a 3D shape can be further reduced. In addition, by calculating the 3D shape for each of the frame data groups, parallel processing with a high concurrency can be performed. This also contributes to a reduction in the time needed to measure the 3D shape. A configuration in which the obtainment of an image in group B is omitted is effective also in the first embodiment in which grouping is performed according to height information, and similar effects can be achieved.

A grouping method is not limited to the method above, and various variations can be made to this embodiment similarly to the first embodiment. As an example, as illustrated in table T2 of FIG. 23, sections in which the ratio is greater than or equal to a specified ratio may be categorized as group A without adding a preliminary section, and group B and group C do not always need to be distinguished from each other. Stated another way, the height range may be divided into two groups, group A and group B.

Third Embodiment

Figure 24:
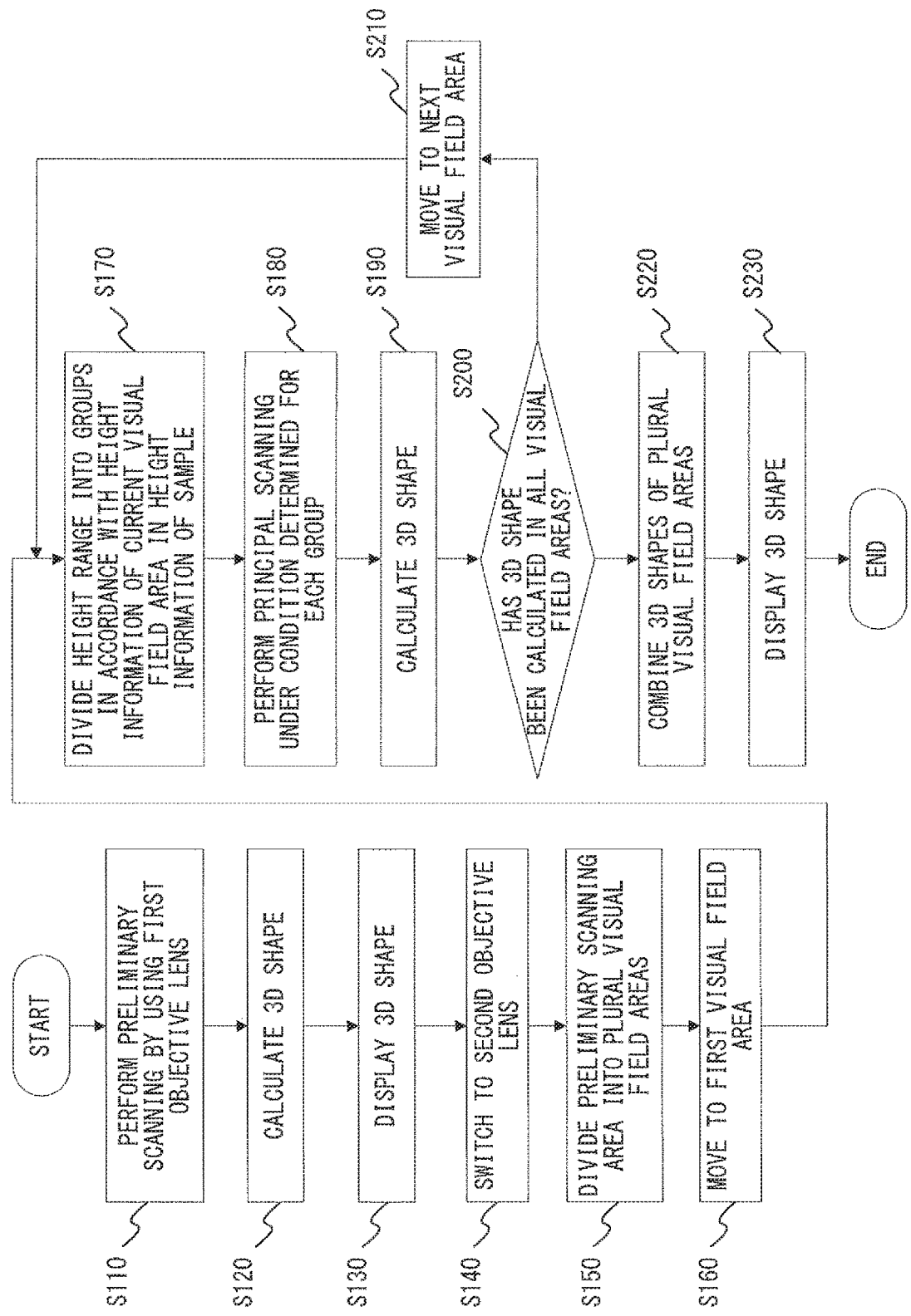
FIG. 24 is a flowchart of the shape measurement processing according to a third embodiment.

FIG. 24 is a flowchart of the shape measurement processing according to this embodiment. The shape measurement processing illustrated in FIG. 24 is performed by a confocal microscope apparatus according to this embodiment (hereinafter simply referred to as a confocal microscope apparatus). The confocal microscope apparatus according to this embodiment has a configuration similar to that of the confocal microscope apparatus 100. Accordingly, the configuration of the confocal microscope apparatus is referred to by using the same reference numerals as those in the confocal microscope apparatus 100.

The shape measurement processing illustrated in FIG. 24 is significantly different from the shape measurement processing illustrated in FIG. 2 in that objective lenses of different magnifications are used in preliminary scanning and principal scanning.

When the shape measurement processing illustrated in FIG. 24 is started, the confocal microscope apparatus first performs preliminary scanning by using an objective lens 6a, which is a first objective lens (step S110), calculates a rough 3D shape of the specimen 15 (step S120), and displays the calculated 3D shape (step S130). The processes of step S110 to step S130 are similar to the processes of step S10 to step S30 in FIG. 2.

The confocal microscope apparatus switches the objective lens to an objective lens 6b, which is a second objective lens (step S140). Here, the controller 30 controls a revolver 5 according to an instruction from the computer 40 so as to switch an objective lens to be arranged on an optical path from the objective lens 6a to the objective lens 6b. The objective lens 6b is an objective lens having a higher magnification than the objective lens 6a.

The confocal microscope apparatus divides a preliminary scanning area into plural visual field areas (step S150). The visual field area is a three-dimensional area that has a size that corresponds to the size of a field of view of the objective lens 6b. More specifically, the visual field area refers to a three-dimensional area for which a size in the XY-direction is equal to the size of the field of view of the objective lens 6b, or is a little smaller than the size of the field of view.

In step S150, the computing processor 44 divides the preliminary scanning area into plural visual field areas each having a size that corresponds to the size of the field of view of the objective lens 6b. The computing processor 44 divides the preliminary scanning area in such a way that portions of visual field areas adjacent to each other overlap each other. FIG. 25A to FIG. 25D illustrate an example of an image in which the height information calculated in step S120 is divided and displayed for each visual field area. The four images illustrated in FIG. 25A to FIG. 25D, image M11, image M12, image M13, and image M14, respectively illustrate the 3D shapes of visual field areas that are different from each other.

When the division of the preliminary scanning area has been finished, the confocal microscope apparatus moves to the first visual field area (step S160). Here, the controller 30 controls the XY-scanning stage 9 in such a way that the optical axis of the objective lens 6b is located at the center of the first visual field area.

The confocal microscope apparatus divides the height range into groups in accordance with the height information of a current visual field area in the height information of the specimen 15 (step S170). The current visual field area refers to a visual field area that is located on the optical axis of the objective lens 6b. Here, the computing processor 44 divides the height range of the current visual field area into groups in accordance with the height information of the current visual field area. A grouping method is similar to step S50 of FIG. 2. As an example, when the current visual field area is an area illustrated as image M11 in FIG. 25A, histogram H11 of FIG. 26A indicating height is generated, and grouping is performed according to histogram H11.

Further, the confocal microscope apparatus performs principal scanning on the current visual field area under a condition determined for each of the groups (step S180), and calculates the 3D shape of the current visual field area (step S190). In step S180 and step S190, processes similar to the processes of step S60 and step S70 of FIG. 2 are performed by the computing processor 44.

The confocal microscope apparatus repeatedly performs the processes of step S170 to step S190 while changing a visual field area (step S210) until a 3D shape is calculated for all of the visual field areas (step S200, YES). FIG. 26A to FIG. 26D illustrate height histograms of the respective visual field areas.

When the 3D shape has been calculated for all of the visual field areas, the confocal microscope apparatus combines the calculated 3D shapes of all of the visual field areas (step S220). Here, the computing processor 44 combines the 3D shapes in such a way that the 3D shapes of overlapping portions of the visual field areas are most matched. A method for evaluating a degree of coincidence in the shape of the overlapping portion is not particularly limited, but a method using a normalized cross-correlation operation, a method using the sum of squares of differential data, or the like can be used, for example.

In the confocal microscope apparatus according to this embodiment, principal scanning is performed by using an objective lens having a magnification higher than the magnification of an objective lens used in preliminary scanning. Therefore, a wide range can be scanned at a high speed in preliminary scanning, and data can be obtained with a high resolving power in principal scanning. Accordingly, more detailed shape measurement than in the first embodiment and the second embodiment can be performed on an area having the same size as in the first embodiment and the second embodiment. In respect to the other effects, this embodiment is similar to the first embodiment and the second embodiment.

In this embodiment, the objective lens used in the first embodiment and the second embodiment is used in preliminary scanning, but this objective lens may be used in principal scanning, and preliminary scanning may be performed by using an objective lens having a lower magnification. In this case, detailed shape measurement that is similar to the shape measurement performed in the first embodiment and the second embodiment can be performed on an area wider than the areas in the first embodiment and the second embodiment.

In the confocal microscope apparatus according to this embodiment, stitching measurement in which measurement results in plural areas are stitched is performed. The Z-scanning range is automatically set for each of the plural areas, and therefore a burden on a user can be greatly reduced in comparison with a conventional confocal microscope apparatus in which the Z-scanning range is manually set for each of the plural areas.

The embodiments described above give specific examples in order to make the invention easily understandable, and the embodiments of the present invention are not limited to the embodiments described above. Various modifications or variations can be made to the scanning confocal microscope apparatus, the scanning control method, and the recording medium of the present invention without departing from the scope specified in the claims.

As an example, in the third embodiment, an example has been described in which plural visual field areas are scanned in principal scanning and the images of the plural visual field areas are stitched together, but preliminary scanning and principal scanning may be performed on plural visual field areas, and images may be stitched together. In this case, after first preliminary scanning in which a first preliminary scanning area is scanned is performed, when second preliminary scanning in which an area overlapping partly with the first preliminary scanning area in a direction orthogonal the optical-axis direction is scanned is performed, the computing processor 44 may determine the height range of a second preliminary scanning area on which second preliminary scanning is performed in accordance with height information obtained in first preliminary scanning.

Figure 27A:
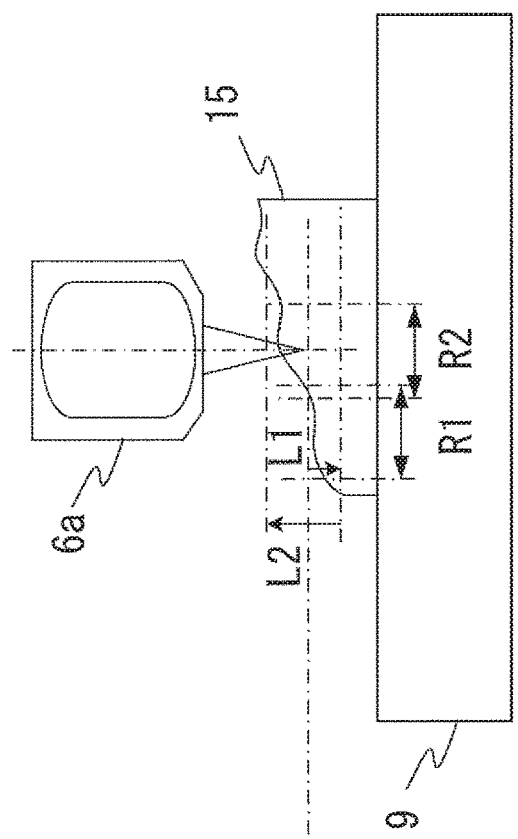
FIG. 27A and FIG. 27B are diagrams explaining a method for moving a visual field area.

A case in which first preliminary scanning is performed in advance on the first visual field area that corresponds to a first visual field range R1, as illustrated in FIG. 27A, is described as an example. In this case, when a second visual field range R2 is scanned, the computing processor 44 first specifies height information of a portion in which the first visual field range R1 and the second visual field range R2 overlap each other in the height information of the first visual field range R1 of the specimen 15. The computing processor 44 determines the height range of the second visual field area that corresponds to the second visual field range R2 in accordance with the specified height information. Here, the computing processor 44 calculates a mode or a mean value of the height of an overlapping portion, and determines the calculated height as a reference height 90 (a start height) in preliminary scanning.

Figure 27B:
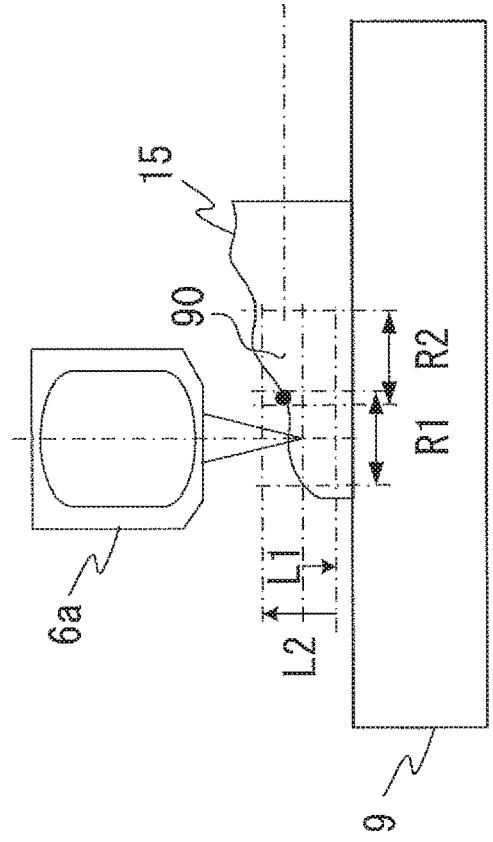

By doing this, the controller 30 controls the confocal microscope body 20 so as to perform second preliminary scanning from a state in which the focal plane of the objective lens 6a is located at the reference height 90, as illustrated in FIG. 27B. Namely, the controller 30 obtains a confocal image, while moving the objective lens 6a by length L1 in a direction toward the specimen 15 from a state in which the focal plane is located at the reference height 90, and moving the objective lens 6a by length L2 in a direction away from the specimen 15.

By determining the height range of an adjacent visual field area in accordance with the height information of a visual field area scanned in advance, as described above, even when the surface of the specimen 15 is significantly inclined, preliminary scanning can be performed on plural visual field areas without missing the surface. Accordingly, the width of a height range in preliminary scanning does not need to be set to be excessively great, and the time needed for preliminary scanning can be reduced.

In the embodiments described above, an example in which a confocal image is obtained in a state in which an objective lens is moving in a direction away from the specimen 15 has been described, but the confocal image may be obtained in a state in which the objective lens is moving in a direction toward the specimen 15. Accordingly, principal scanning is started after the objective lens moves from a Z-position in which preliminary scanning has been finished to the closest of a bottom end or a top end of a section categorized as group A. As an example, in a case in which preliminary scanning is performed in a state in which the objective lens is moving in a direction toward the specimen 15, principal scanning may be performed in a state in which the objective lens is moving in a direction away from the specimen 15.

In addition, in the embodiments described above, an example in which a Z-scanning speed during preliminary scanning is constant has been described, but the objective lens 6a does not need to move at a strictly constant speed during preliminary scanning, and the Z-scanning speed may have variations. All of the confocal microscope apparatuses according to the embodiments described above incorporate the displacement gauge 7, and therefore Z-position information at the time of obtaining an image can be accurately grasped. Therefore, even when the Z-scanning speed varies and the slice interval also varies, height information can be accurately calculated. For a similar reason, a difference may be generated between a Z-scanning speed determined for each group and an actual Z-scanning speed during principal scanning, and even in this case, the height information can be accurately calculated.

Further, in the embodiments described above, an example in which a 3D shape is calculated has been described, but an omnifocal image may be generated according to the peak luminance value distribution $I(x_i, y_j)$ obtained at the time of calculating the 3D shape. By constructing a new image in which maximum luminance values in respective pixel positions specified from plural confocal images are used as the luminance values of respective pixels, an omnifocal image in which all portions on the surface of a specimen are put into focus can be generated. The omnifocal image is referred to as an extended-focus image.

What is claimed is:

1. A scanning confocal microscope apparatus comprising:
a scanning confocal microscope that includes an objective lens, and that scans a sample by irradiating the sample with a laser beam collected in a spot shape by the objective lens;
a computing device that divides a range in a direction of an optical axis of the objective lens of a preliminary scanning area on which preliminary scanning has been performed into a plurality of groups, in accordance with data obtained by performing the preliminary scanning on the sample using the scanning confocal microscope; and
a controller that controls the scanning confocal microscope so as to perform principal scanning on the sample in which at least a portion of the preliminary scanning area is scanned under a measurement condition determined for each of the plurality of groups,
wherein the controller controls the scanning confocal microscope such that an interval in the direction of the optical axis between a plurality of confocal images of the sample obtained in performing the principal scanning on the sample is different for each of the plurality of groups, and
wherein the computing device calculates a shape of the sample in accordance with data obtained by performing the principal scanning on the sample using the scanning confocal microscope, and generates a three-dimensional image.

2. The scanning confocal microscope apparatus according to claim 1, wherein the computing device divides the range in the direction of the optical axis of the preliminary scanning area into the plurality of groups in accordance with height information of the sample, the height information being obtained by performing the preliminary scanning on the sample using the scanning confocal microscope.

3. The scanning confocal microscope apparatus according to claim 1, wherein the computing device divides the range in the direction of the optical axis of the preliminary scanning area into the plurality of groups in accordance with luminance information of a plurality of confocal images obtained by performing the preliminary scanning on the sample using the scanning confocal microscope.

4. The scanning confocal microscope apparatus according to claim 1, wherein the controller controls the scanning confocal microscope such that a scanning speed in the direction of the optical axis in the principal scanning is different for each of the plurality of groups.

5. The scanning confocal microscope apparatus according to claim 1, wherein the controller controls the scanning confocal microscope such that a speed of two-dimensional scanning in a direction orthogonal to the direction of the optical axis in the preliminary scanning is higher than a speed of the two-dimensional scanning in the direction orthogonal to the direction of the optical axis in the principal scanning.

6. The scanning confocal microscope apparatus according to claim 1, wherein the computing device performs:
generating a histogram indicating a height of the sample from height information of the sample; and
dividing the range in the direction of the optical axis of the preliminary scanning area into the plurality of groups in accordance with the histogram indicating the height.

7. The scanning confocal microscope apparatus according to claim 1, wherein the computing device performs:
performing smoothing processing on height information of the sample;

generating a histogram indicating a height of the sample from the smoothed height information of the sample; and dividing the range in the direction of the optical axis of the preliminary scanning area into the plurality of groups in accordance with the histogram indicating the height.

8. The scanning confocal microscope apparatus according to claim 6, wherein the computing device categorizes a first height section in which a frequency specified according to the histogram indicating the height exceeds a threshold as one of the plurality of groups.

9. The scanning confocal microscope apparatus according to claim 6, wherein the computing device categorizes a first height section obtained by adding a preliminary section to both ends of a section in which a frequency specified according to the histogram indicating the height exceeds a threshold as one of the plurality of groups.

10. The scanning confocal microscope apparatus according to claim 8, wherein the computing device sets sections other than the first height section included in the preliminary scanning area, to be located outside a principal scanning area in which the principal scanning is performed.

11. The scanning confocal microscope apparatus according to claim 8, wherein the computing device sets a section in contact with an upper limit or a lower limit of the preliminary scanning area from among sections other than the first height section, the sections being included in the preliminary scanning area, to be located outside a principal scanning area in which the principal scanning is performed.

12. The scanning confocal microscope apparatus according to claim 1, wherein the computing device divides the range in the direction of the optical axis of the preliminary scanning area into the plurality of groups in accordance with a ratio of luminance information that exceeds a threshold with respect to luminance information of respective confocal images obtained in the preliminary scanning.

13. The scanning confocal microscope apparatus according to claim 1, wherein the computing device further causes a display device to display a shape of the sample calculated according to data obtained in the preliminary scanning.

14. The scanning confocal microscope apparatus according to claim 1, wherein:

the computing device generates brightness correction information in accordance with luminance information of a plurality of confocal images obtained in the preliminary scanning, and the controller controls the scanning confocal microscope so as to perform the principal scanning by using a brightness setting different from a brightness setting in the preliminary scanning, in accordance with the brightness correction information.

15. The scanning confocal microscope apparatus according to claim 1, wherein:

the computing device generates brightness correction information for each section categorized as a same group, the sections being separated from each other, in accordance with luminance information of a plurality of confocal images obtained in the preliminary scanning, and the controller controls the scanning confocal microscope so as to perform the principal scanning by using a brightness setting different from a brightness setting in the preliminary scanning, in accordance with the brightness correction information that is different for each of the sections that are separated from each other.

16. The scanning confocal microscope apparatus according to claim 1, wherein when the scanning confocal microscope performs first preliminary scanning in which a first preliminary scanning area is scanned, and performs second preliminary scanning in which an area partly overlapping with the first preliminary scanning area in a direction orthogonal to the direction of the optical axis is scanned, the computing device determines a range in the direction of the optical axis of a second preliminary scanning area in which the second preliminary scanning is performed in accordance with height information of the sample, the height information being obtained in the first preliminary scanning.

17. The scanning confocal microscope apparatus according to claim 1, further comprising:

a second objective lens that has a magnification higher than a magnification of the objective lens, wherein the computing device performs:

dividing the preliminary scanning area into a plurality of visual field areas each having a size that corresponds to a size of a field of view of the second objective lens;

dividing, in each of the plurality of visual field areas, a range in the direction of the optical axis of the second objective lens of a corresponding visual field area into the plurality of groups in accordance with data of the corresponding visual field area in data obtained in the preliminary scanning; and controlling the scanning confocal microscope so as to perform, in each of the plurality of visual field areas, the principal scanning in which at least a portion of a corresponding visual field area is scanned under a measurement condition determined for each of the plurality of groups.

* * * * *